United States Patent [19]

Tanaka et al.

[11] Patent Number: 5,550,657
[45] Date of Patent: Aug. 27, 1996

[54] LIQUID CRYSTAL DISPLAY DEVICE HAVING AN OPTIMIZED RIDGED LAYER TO IMPROVE LUMINOSITY

[75] Inventors: Akira Tanaka; Yoshinori Mesaki; Akio Sotokawa, all of Kawaski; Masahiro Tomatsu; Kazumasa Kaiwa, both of Yokohama, all of Japan

[73] Assignee: Fujitsu Limited, Japan

[21] Appl. No.: 118,816

[22] Filed: Sep. 10, 1993

[30] Foreign Application Priority Data

Sep. 14, 1992 [JP] Japan .................................. 4-245158

[51] Int. Cl.$^6$ .................................................. G02F 1/1335
[52] U.S. Cl. ........................... 359/49; 359/599; 362/330; 362/336; 362/31
[58] Field of Search .................................. 359/48, 49, 50, 359/42, 599, 69, 461; 362/26, 31, 330, 339; 40/546

[56] References Cited

U.S. PATENT DOCUMENTS

| Re. 33,987 | 7/1992 | Suzava | 359/49 |
|---|---|---|---|
| 4,791,540 | 12/1988 | Dreyer, Sr. et al. | 362/31 |
| 5,136,480 | 8/1992 | Pritash et al. | 362/26 |
| 5,161,041 | 11/1992 | Abileah | 359/49 |
| 5,165,772 | 11/1992 | Wu | 362/339 |
| 5,262,880 | 11/1993 | Abileah | 359/69 |
| 5,280,371 | 1/1994 | McCartney, Jr. et al. | 359/69 |
| 5,394,255 | 2/1995 | Yokota et al. | 359/49 |
| 5,414,599 | 5/1995 | Kaneko et al. | 362/31 |

FOREIGN PATENT DOCUMENTS

| 56401 | 9/1991 | Japan . |
|---|---|---|
| 4-104125 | 4/1992 | Japan . |

OTHER PUBLICATIONS

"New Backlighting Technologies for Liquid Crystal Display," Mesaki et al, Feb. 1993.
"New Backlighting Technologies for Liquid Crystal Display (II)," Mesaki et al, Jul. 1993.
"New Backlighting Technologies for Liquid Crystal Display (III)," Mesaki et al Jul. 1993.

*Primary Examiner*—Anita Pellman Gross
*Assistant Examiner*—Kenneth Parker
*Attorney, Agent, or Firm*—Staas & Halsey

[57] ABSTRACT

A planar illumination unit includes an optical guide layer for guiding light therethrough and emitting the light from a top surface, a light source fixture provided so as to face a side wall of the optical guide layer for injecting a light into the optical guide layer, an optical scattering layer disposed above the top surface of the optical guide layer for causing a scattering in the light that has been received from the optical guide layer, and a reflector provided on a bottom surface of the optical guide layer for reflecting the light incident to the optical guide layer, wherein the light source fixture includes a reflector for reflecting the light that has been produced by a light source in a direction primarily offset from the light source.

5 Claims, 21 Drawing Sheets

LIQUID CRYSTAL DISPLAY DEVICE HAVING AN OPTIMIZED RIDGED LAYER TO IMPROVE LUMINOSITY

BACKGROUND OF THE INVENTION

1. Field of the Invention

The present invention generally relates to planar display devices and more particularly to a liquid crystal display device having a planar light source wherein the luminance is improved.

2. Description of the Related Art

In the planar display devices, particularly the liquid crystal display panels, a backlight illumination unit is provided behind a liquid crystal cell panel for improving the visibility of the displayed image. In correspondence to the planar construction of the liquid crystal display unit, the backlight illumination unit has also a planar construction.

FIG. 1 shows an example of the construction of a liquid display panel.

Referring to FIG. 1, the liquid crystal display panel includes a liquid crystal cell panel 1 having a display area 2, wherein a display pattern is formed on the display area 2 by inducing an orientation in the liquid crystal molecules in the panel 1. The liquid crystal display device further includes a planar illumination unit 3 behind the liquid crystal cell panel 1, and the planar illumination unit 3 radiates light at a luminous surface 4 that faces the liquid crystal cell panel 1. In such a liquid crystal display panel, the planar illumination unit 3 is required to have a high and uniform luminance throughout the luminous surface 4.

FIG. 2 shows the schematical construction of the planar illumination unit 3 used in the conventional liquid crystal display device.

Referring to FIG. 2, the unit 3 includes an optical guide plate 5 of a transparent material such as an acrylic resin, and a cold cathode tube 6 is disposed so as to face a side wall 5a of the optical guide plate 5. Thereby, the optical guide plate 5 guides the light that has been produced by the cold cathode tube 6 and injected at the side wall 5a and emits the same from a principal surface 11 that acts as a luminous surface.

The cold cathode tube 6 is held by a holder 7 in alignment with the optical guide plate 5, wherein the holder 7 has a reflective surface 7a for reflecting the light that has been produced by the cold cathode tube 6 to the foregoing side wall 5a of the waveguide plate 5. In addition, there is provided a planar reflector 8 at a side wall 5b opposite to the side wall 5a for reflecting back the light that has been emitted from the optical guide plate 5. Further, a planar reflector 10 is provided adjacent to a bottom principal surface 9 of the optical guide plate 5 such that the reflector 10 faces the surface 9. Thereby, the light that has leaked from the optical guide plate 5 through the bottom surface 9 is reflected back to the optical guide plate 5.

Above the optical guide plate 5, there is provided an optical scattering plate 12 such that the plate 12 faces the foregoing luminous surface 11. The optical scattering plate 12 has a milky whitish appearance and causes a scattering in the light that passes therethrough. As a result, the backlight emitted from the optical scattering plate 12 has a uniform luminance.

In such a liquid crystal display panel, it is necessary to increase the luminance of the backlight that is emitted at the luminous surface 11 of the optical guide plate 5. On the other hand, experience indicates that mere increase of the optical power of the cold cathode tube 6 is not effective for the desired increase of luminance of the planar illumination unit 3. Contrary, such an increase of the optical power of the cold cathode tube 6 invites an increased electrical power consumption and increased size of the device. In view of the fact that the liquid display panels are widely used in small, portable computers and word processors, such an increase in the electrical power or size is not acceptable.

In designing the planar illumination unit 3, therefore, it is important to reduce the loss of the light that has been emitted by the cold cathode tube 6 and to maximize the proportion of the light that is emitted from the luminous surface 11. The inventors of the present invention have conducted a series of analysis with respect to the propagation of the light that has been emitted from the cold cathode tube 6 and discovered the following facts. The result of the investigation is reported in MESAKI, Y., et al., TECHNICAL REPORT OF IEICE, EID92-126, ED92-159 (1993-02), pp.83–90, MESAKI, Y., et al., TECHNICAL REPORT OF IEICE, EID93-33 (1993-07), pp. 45–50, MESAKI, Y., et al., TECHNICAL REPORT OF IEICE, CPM93-33, OME93-19 (1993-07), all of which are published after the priority date of the present application.

The light emitted from the cold cathode tube 6 propagates typically along one of the paths $P_1$–$P_5$ indicated in FIG.2, wherein $P_1$ represents the path of the light that enters directly into the optical guide plate 5 through the side wall 5a; $P_2$ represents the path of the light that enters the optical guide plate 5 after a reflection at the holder 7; $P_3$ represents the path of the light that is absorbed by the holder 7; $P_4$ represents the path of the light that is absorbed by the cold cathode tube 6 after reflection at the holder 7; and $P_5$ represents the light that has been emitted from the cold cathode tube 6 but failed to enter the optical guide plate 5. In correspondence to the paths $P_1$–$P_5$, there holds a relationship $$LP_1 + LP_2 + LP_3 + LP_4 + LP_5 = LP_0, \qquad (1)$$

wherein $LP_1$–$LP_5$ represents the amount or energy of the light for each of the paths $P_1$–$P_5$ while $LP_0$ represents the total energy of the light that has been emitted from the cold cathode tube 6.

It should be noted that the above analysis indicates that the energy of the light that enters actually to the optical guide plate 5 is represented as $$LP_{in} = LP_1 + LP_2 \qquad (2)$$

where $LP_{in}$ represents the energy of the light entering into the waveguide plate 5. The rest of the light has been lost. Thus, conventional planar illumination unit 3 suffers from the problem that the efficiency of injecting the light from the cold cathode tube 6 to the optical guide plate 5 is poor when the contribution of the terms $LP_3$–$LP_5$ is substantial. With this regard, one should note that the cold cathode tube 6 carries a fluorescent material for emitting the light, while such a fluorescent material also absorbs light that is incident thereto. Although the light absorbed by the fluorescent material may be re-emitted, substantial loss of light cannot be avoided during such a process.

Meanwhile, there is a proposal to align the direction of emission of the light from the planar illumination unit 3 so as to increase the luminance of the unit 3 with respect to the direction perpendicular to the unit 3. For this purpose, a prismatic lens film carrying, on a transparent film, a number of parallel ridges or stripes of triangular cross section, is disposed on the scattering plate 12. However, such a prismatic lens film tends to cause an excessively sharp directivity in that the luminance drops sharply when the view angle has exceeded a certain threshold. When such a light source unit 3 is used for a liquid crystal display device, therefore, there occurs an inconvenience that the person who is not facing the display panel directly cannot see the displayed image at all. It is desirable to provide a more gentle change of the luminance as a function of the view angle.

SUMMARY OF THE INVENTION

Accordingly, it is a general object of the present invention to provide a novel and useful planar illumination unit as well as a liquid crystal display unit wherein the foregoing problems are eliminated.

Another and more specific object of the present invention is to provide a planar illumination unit wherein the loss of the light caused by a fluorescent material on a cold cathode tube, after the light is emitted from said cold cathode tube and is reflected back again to said cold cathode tube, is successfully minimized.

Another object of the present invention is to provide a planar illumination unit, comprising:

an optical guide layer having first and second, mutually opposing principal surfaces, said optical guide layer being laterally defined by a side wall and guiding a light incident thereto at said side wall, said optical guide layer emitting said light from said first principal surface;

light source means provided so as to face said side wall of said optical guide layer for injecting a light into said optical guide layer through said side wall;

an optical scattering layer having first and second, mutually opposing principal surfaces, said optical scattering layer being disposed such that said second principal surface of said optical scattering layer faces said first principal surface of said optical guide layer, for receiving said light emitted from said first principal surface of said optical guide layer, said optical scattering means causing a scattering in said light that has been received from said optical guide layer and emitting said light from said first principal surface; and first reflection means provided on said second principal surface of said optical guide layer for reflecting a light incident to said second principal surface of said optical guide layer;

said optical source means including an optical source for emitting said light and second reflection means for reflecting the light that has been produced by said optical source toward said side wall, wherein said reflection means reflects said light in a direction primarily offset from said optical source.

According to the present invention, the problem of absorption of the light by the fluorescent material provided on the optical source means after the light being reflected back to the light source means by the reflection means, is effectively eliminated.

Another object of the present invention is to provide a planar illumination unit having an increased luminance in the direction perpendicular to the plane of the light source unit while maintaining a smooth angular pattern of radiation profile.

Another object of the present invention is to provide a planar illumination unit, comprising:

an optical guide layer having first and second, mutually opposing principal surfaces, said optical guide layer being laterally defined by a side wall and guiding a light incident thereto at said side wall, said optical guide layer emitting said light from said first principal surface;

a light source means provided so as to face said side wall of said optical guide layer for injecting a light into said optical guide layer through said side wall, said light source means including reflection means for reflecting said light that has been produced by said light source means toward said side wall of said optical guide layer;

an optical scattering layer having first and second, mutually opposing principal surfaces, said optical scattering layer being disposed such that said second principal surface of said optical scattering layer faces said first principal surface of said optical guide layer, for receiving said light emitted from said first principal surface of said optical guide layer, said optical scattering means causing a scattering in said light that has been received from said optical guide layer and emitting said light from said first principal surface;

reflection means provided on said second principal surface of said optical guide layer for reflecting a light incident to said second principal surface of said optical guide layer; and directivity means having first and second opposing principal surfaces and provided on said first principal surface of said optical guide layer such that said second principal surface of said directivity means faces said first principal surface of said optical guide layer, said directivity means being disposed such that said first principal surface of said directivity means faces said second principal surface of said optical scattering means, said directivity means carrying a plurality of ridges on said first principal surface so as to extend parallel with each other.

According to the present invention, the optical beam is emitted from the optical guide layer in the direction substantially perpendicular to the plane of the optical guide layer with an improved directivity and the luminance of the unit increases as long as viewed in the direction perpendicular to the plane of the unit. Further, because of the fact that the directivity means is disposed between the optical guide layer and the optical scattering means, the optical beam emitted from the directivity means experiences a scattering in the optical scattering means, and the problem of undesirable sharp dropping of luminance when the view angle exceeds a certain critical angle is substantially reduced. In a preferred embodiment of the present invention, the peak angle of the ridges is optimized such that the light having an arbitrary angle of incidence, with respect to the first principal surface of the directivity means, is emitted.

Another object of the present invention is to provide a planar illumination unit having an optical guide layer for guiding a light injected at a side edge thereof and for emitting the injected light from a principal surface, wherein the principal surface is tilted with an optimized tilt angle such that the light incident to the optical guide layer at a side edge part thereof with an arbitrary angle of incidence, is emitted from the foregoing tilted principal surface.

Other objects and further features of the present invention will become apparent from the following detailed description when read in conjunction with the attached drawings.

DETAILED DESCRIPTION OF THE PREFERRED EMBODIMENTS

Figure 1:
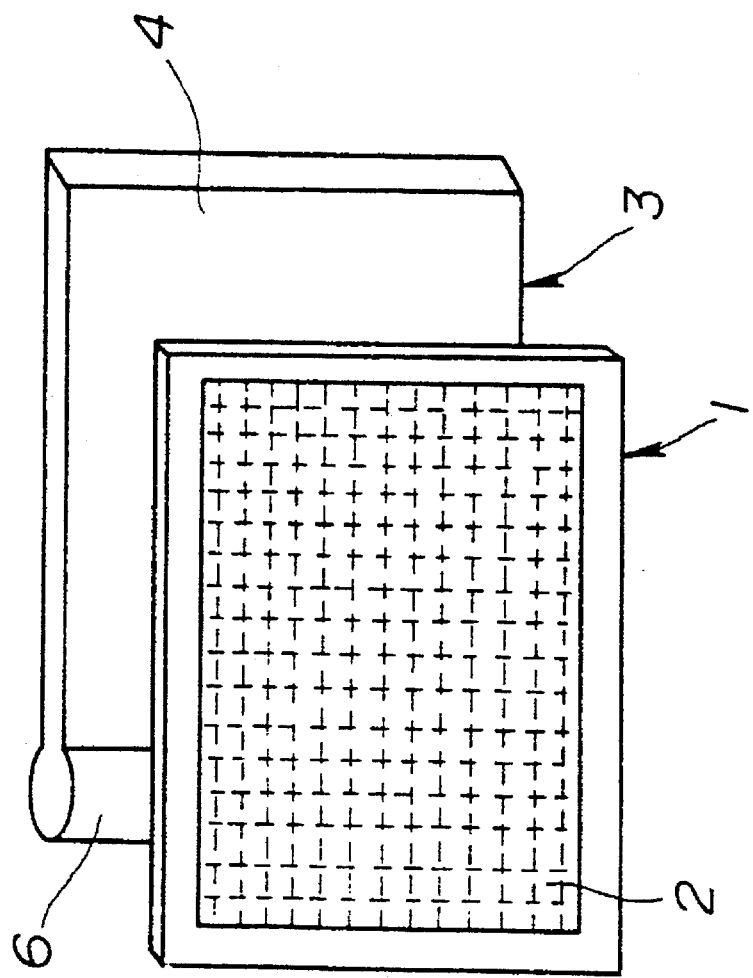
FIG. 1 (Prior Art) is a diagram showing the general construction of a liquid crystal display panel.
Figure 2:
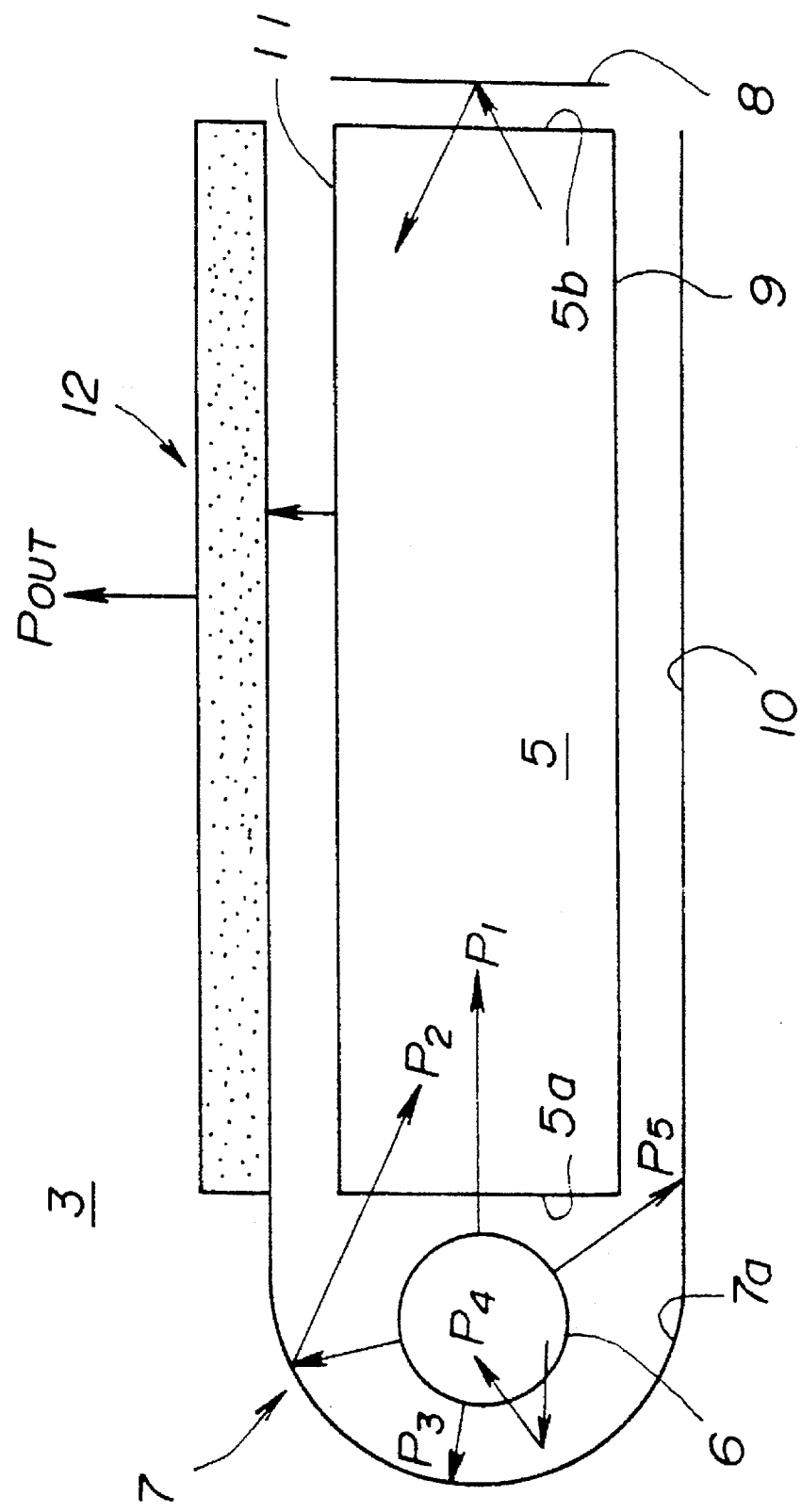
FIG. 2 (Prior Art) is a diagram showing the construction of a conventional planar illumination unit.
Figure 3:
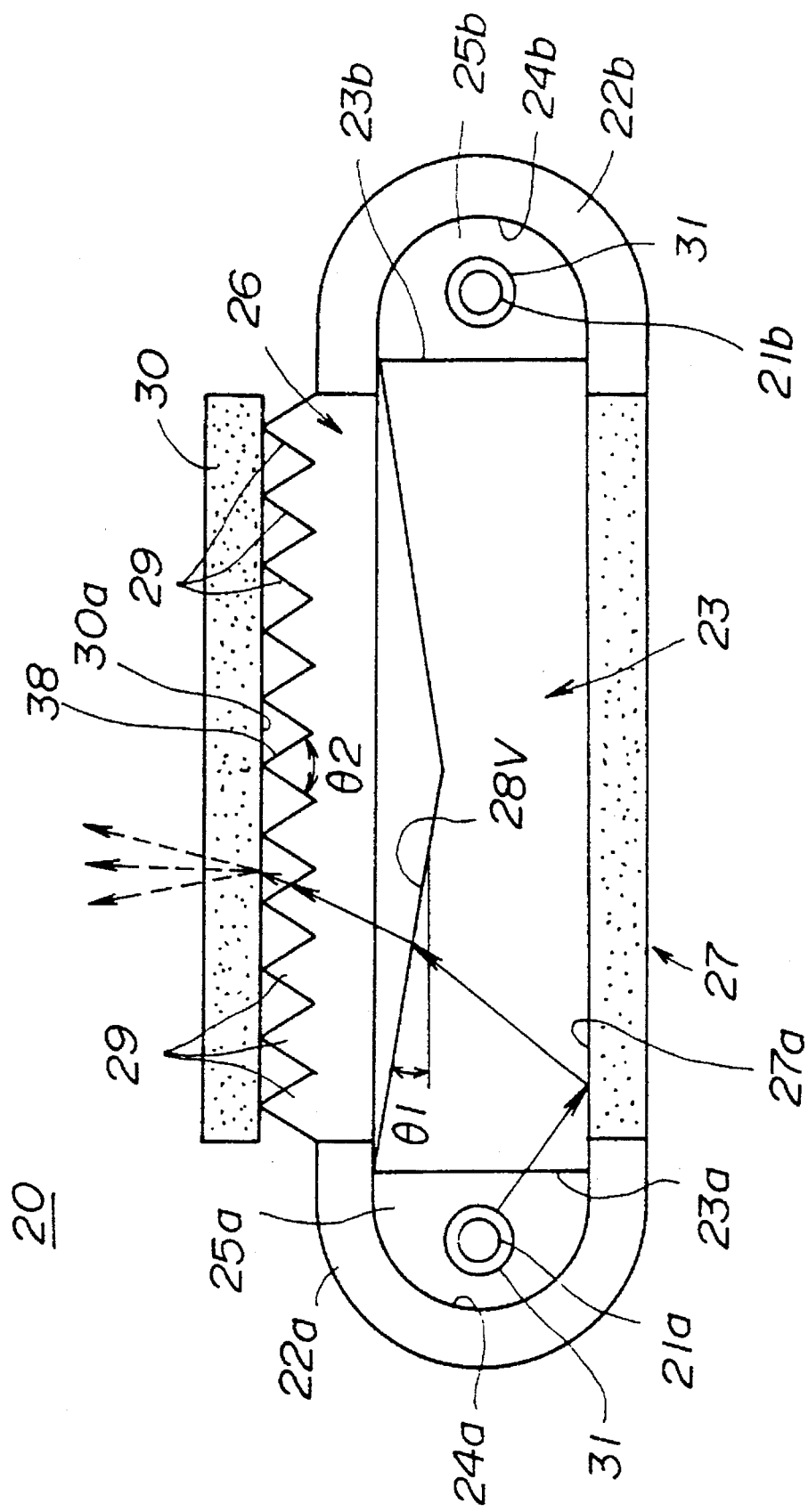
FIG. 3 is a diagram showing the construction of a planar illumination unit according to an embodiment of the present invention.

FIG. 3 shows a planar illumination unit 20 according to a first embodiment of the present invention. In FIG. 3 as well as other drawings, the vertical axis is somewhat expanded for the sake of convenience of the illustration. Thus, a cold cathode tube having a circular cross section is represented to have an apparently elongated circular cross section.

Referring to FIG. 3, the planar illumination unit 20 includes an optical guide plate 23 and a pair of cold cathode tubes 21a and 21b disposed at both sides of the optical guide plate 23 so as to face side walls 23a and 23b of the optical guide plate 23. Adjacent to the cold cathode tubes 21a and 21b, there are provided holders 22a and 22b respectively, wherein the holders 22a and 22b carry respective reflectors 24a and 24b for reflecting the light that has been produced by the cold cathode tubes 21a and 21b, such that the light produced by the tube 21a is injected to the plate 23 at the side wall 23a after reflection at the reflector 24a while the light produced by the tube 21b is injected to the plate 23 at the side wall 23b after reflection at the reflector 24b. The reflectors 24a and 24b may be formed of a metal coating and have a reflectivity of almost 100%.

In the illustrated example, there are provided materials 25a and 25b having a high refractive index between the cold cathode tube and the reflector such that the material 25a fills the space between the tube 21a and the reflector 24a and the material 25b fills the space between the tube 21b and the reflector 24b. The materials 25a and 25b have the foregoing high refractive index set to be larger than the refractive index of the glass that forms the tubes 21a and 21b, and the light that has been produced by the tubes 21a and 21b is effectively guided to the optical guide plate 23 via the materials 25a and 25b.

The optical guide plate 23 may be formed by a transparent resin such as acrylic resin (for example, a resin in which a copolymer of methyl methacrylate and vinyl benzoate designated as poly(MMA-co-VB) or poly(2,2,2-trifluoroethyl methacrylate) designated as PF3FMA is dispersed in poly-(methyl methacrylate) designated as PMMA), and guides the light that has been emitted from the cold cathode tube 21a or 21b and injected at the side walls 23a and 23b to a prismatic lens film 26 that is disposed on an upper principal surface 28 of the plate 23. The prismatic lens film 26 will be described later. Further, a reflection layer 27 is disposed on the lower principal surface 27a of the plate 23 for reflecting the light in the optical guide plate 23 toward the prismatic lens film 26, wherein there is formed a reflection diffusion structure or pattern at the foregoing lower principal surface 27a of the plate 23 for causing a diffusion in the light that is reflected by the reflection layer 27.

It should be noted that the upper principal surface 28 of the optical guide plate 23 is formed to have a tilt angle to form a V-shape in the cross section, for eliminating the total reflection of the light at the central part of the surface 28. By providing such a tilt angle to the surface 28, it is possible to reduce the incident angle of the light at the central part of the optical guide plate 23, and the desired reduction of the total reflection at the surface 28 is achieved. With such a construction, it is possible to reduce the thickness of the optical guide plate 23, without causing a total reflection of the light. In the present invention, as will be described in detail later, the tilt angle $\theta_1$, defined with respect to a horizontal surface is optimized, and an efficient emission of the light from the optical guide plate 23 can be achieved.

Hereinafter, the foregoing prismatic lens film 26 will be described briefly. The prismatic lens film 26 has a number of ridges 29 extending parallel with each other, wherein each ridge 29 has a triangular cross section. Thereby, each ridge 29 acts as an optical prism, and such a prismatic lens film 26 provides a directivity in the light that passes through the film 26. In the illustrated example, the ridges 29 have a shape of isosceles triangle with an apex angle $\theta_2$ that is optimized for an efficient radiation of the optical beam from the prismatic lens film 26, as will be described later in detail.

Above the prismatic lens film 26, there is disposed an optical scattering plate 30. The optical scattering plate 30 has a milky whitish appearance and causes a scattering in the light that has been injected thereto. As a result of the scattering, the light that is emitted from the scattering plate 30 has a uniform luminance throughout the area of the plate 30.

Hereinafter, the features of the present invention will be described. The first feature of the present invention resides in the point that the planar illumination unit 20 has the holders 22a and 22b that are adapted for optimum injection of the light, which is emitted from the cold cathode tube 21a or 21b, into the optical guide plate 23.

It should be noted that one has to set the incidence angle of the light with respect to the side walls 23a and 23b of the optical guide plate 23, in order to achieve the injection of the light into the plate 23 at the side walls 23a and 23b.

Figure 4:
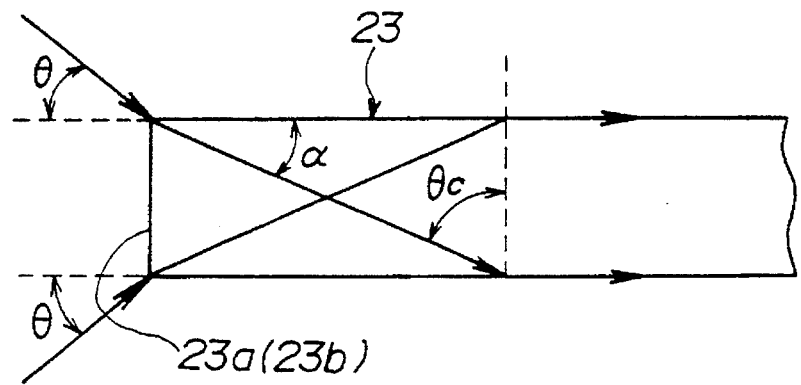
FIG. 4 is a diagram for explaining a first feature of the present invention.

FIG. 4 shows the analysis for such an injection of the light.

Referring to FIG. 4, there holds the Fresnel's law represented at the side wall 23a or 23b as $$\sin \theta = n \cdot \sin \alpha \tag{3}$$

wherein $\theta$ stands for the incidence angle, $\alpha$ stands for the refraction angle and n stands for the refractive index of the optical guide plate 23.

On the other hand, from an elementary geometry, there holds a relationship $$\alpha = 90° - \theta_c \tag{4}$$

where $\theta_c$ stands for the incidence angle of the light that impinges upon the lower principal surface 27a of the optical guide plate 23. In order that the light is guided along the plate 23, it is necessary that the light impinging upon the lower principal surface 27a is reflected. Thus, there must be a relationship $$n \cdot \sin \theta_c = 1. \tag{5}$$

Assuming that the optical guide plate 23 is formed of an acrylic resin of which refractive index n is 1.49, the foregoing equation gives the value of 42° for the angle $\theta_c$. Thereby, one obtains an angle of about 90° for the incidence angle $\theta$.

The foregoing analysis indicates that the light incident to the optical guide plate 23 at the side walls 23a and 23b from the upper left direction with any arbitrary angle can be guided through the plate 23, except for the Fresnel reflection.

Here, the relationship of Eq. (1) mentioned previously is again noted.

$$LP_1 + LP_2 + LP_3 + LP_4 + LP_5 = LP_0 \tag{1}$$

In Eq. (1), it will be noted that the optical energy corresponding to the first and second terms $LP_1$ and $LP_2$ is injected into the optical guide plate 23 without adjusting geometrical parameters, while the optical energy corresponding to the rest of the terms $LP_3$–$LP_5$ changes depending on the adjustment of the optical construction. In other words, it is possible to achieve the successful injection into the optical guide plate 23 by adjusting the optical construction of the optical guide plate 23. Hereinafter, optimization of the individual terms will be examined with respect to the third through fifth terms.

The third term $LP_3$ represents the luminance or optical power that is absorbed by the holders 22a and 22b. As described previously, the holders 22a and 22b carry reflective coatings 24a and 24b, and the improvement in the quality of the reflective coatings reduces the optical loss. Today, a reflective coating that provides a reflectivity of almost 100% is available, and one can eliminate the loss caused by the term $L_3$ substantially completely.

Figure 5:
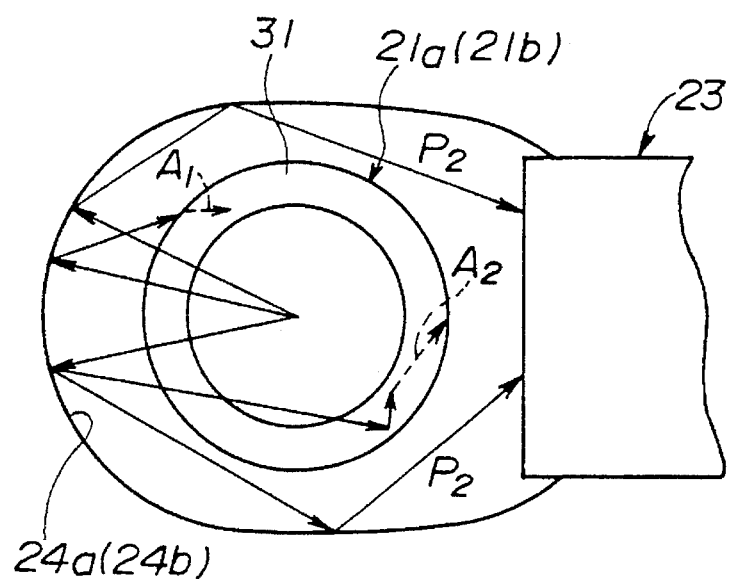
FIG. 5 is a diagram showing the absorption of the light occurring at a cold cathode tube from which the light has been emitted.

The fourth term $LP_4$ represents the optical energy that is absorbed by the cold cathode tubes 21a and 21b after reflection at the holders 22a and 22b. When the light, emitted from the cold cathode tubes 21a and 21b, has returned again to the cold cathode tubes, the light may be absorbed by the fluorescent materials applied upon a glass tube 31 of the cold cathode tubes 21a or 21b as indicated by an arrow $A_1$ in FIG. 5. Alternatively, the light thus returned may be guided along the tube 31 as indicated by an arrow $A_2$ and absorbed as it travels along the tube. It turned out that the effect of this term is substantial as reported by Mesaki et al. (Mesaki, Y., Sotokawa, A., Tanaka, A., Tomatsu, M., Kaiwa, K., TECHNICAL REPORT OF IEICE, EID92-126, ED92-159, 1993-02), wherein about 38.8% of the optical energy is lost in this process.

The effect of the term $LP_5$ can be minimized easily by providing a reflective coating having an improved reflectance for the reflection layer 27.

Figure 6A:
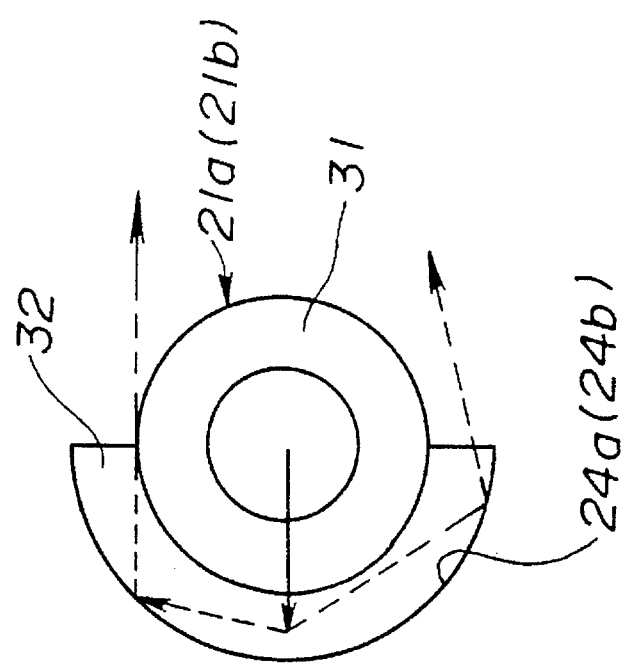
FIGS. 6(A) and 6(B) are diagrams showing an embodiment of a holder having the first feature of the present invention and used in the planar illumination unit of the present invention.

In order to eliminate the light from returning to the cold cathode tubes 21a and 21b, one may provide an optical guide layer of high refractive index such as a layer 25a or a layer 25b in correspondence to the space between the holder 22a or 22b and the cold cathode tube 21a or 21b as indicated in FIG. 6(A). Thereby, the difference in the refractive index between the glass tube 31 forming the cold cathode tube 21a or 21b and the optical guide layer 25a or 25b eliminates the light reflected at the reflection coating 24a or 24b from entering into the glass tube 31 even when the light has returned to the cold cathode tube, and the problem of the absorption of the light by the fluorescent material is reduced. It should be noted that the surface of the glass tube 31 reflects back the light to the optical guide layer 25a or 25b, and the light thus reflected are ultimately guided to the side wall 23a or 23b of the optical guide plate 23 after repeating the reflection at the surface of the reflective coating 24a or 24b.

Figure 6B:
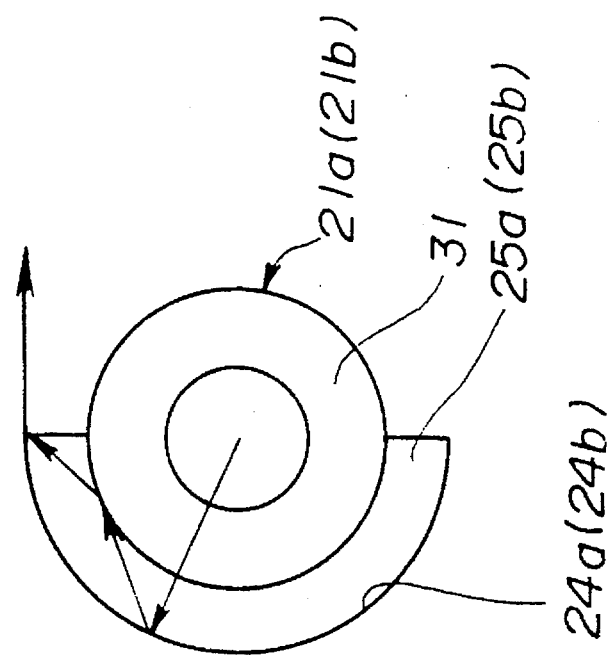

FIG. 6(B) shows another embodiment for eliminating the absorption of the light by the cold cathode tubes 21a and 21b, wherein the embodiment of FIG. 6(B) employs fluorescent material introduced into the optical guide layer 25a or 25b for absorbing and re-emitting the light that is guided along the optical guide layer.

Figure 7:
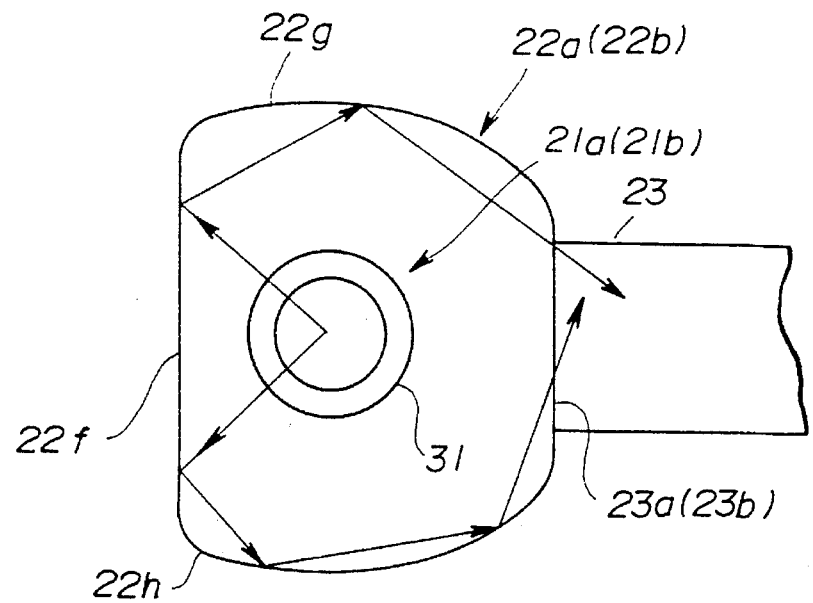
FIGS. 7–13 are diagrams showing embodiments of other holders having the first feature of the present invention and used in the planar illumination unit of the present invention.
Figure 8:
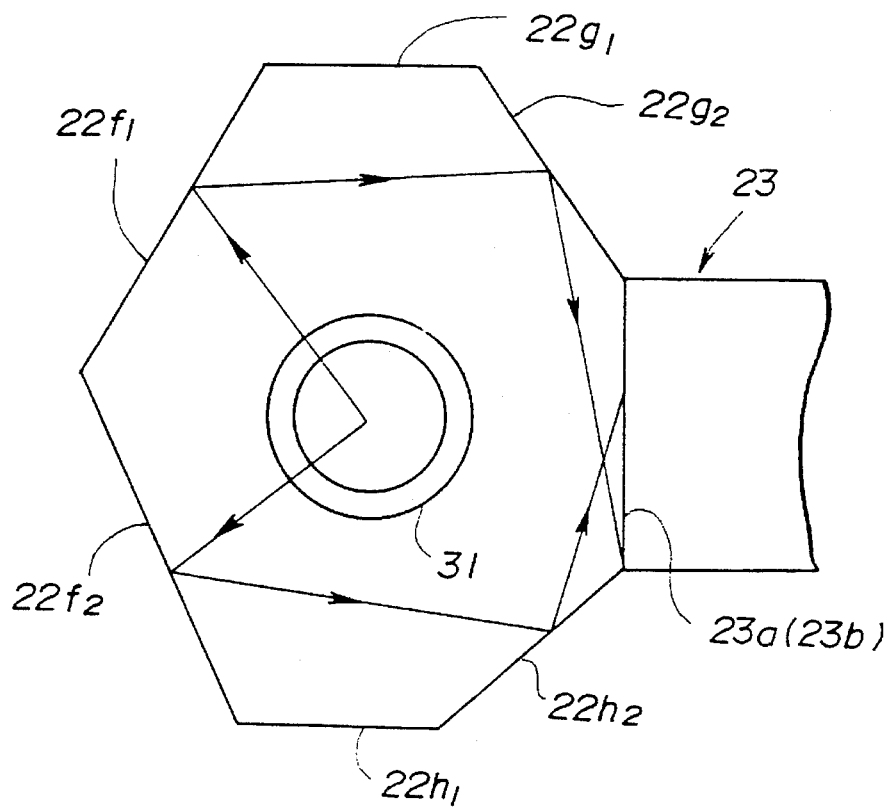

FIGS. 7 and 8 show another embodiment of the present invention wherein the shape of the holders 22a and 22b is optimized such that the light reflected at the reflective coating on the holders does not return to the cold cathode tube 21a or 21b. In the embodiment of FIG. 7, there is formed a flat surface 22f so as to face the side wall 23a or 23b of the optical guide layer, and curved walls 22g and 22h connect the surface 22f to the optical guide plate 23. Thereby, most of the light that has been emitted by the cold cathode tube 21a or 21b and reflected at the flat surface 22f are guided to the optical guide plate 23 after reflection at the curved walls 22g or 22h. It should be noted that the flat surface 22f as well as the curved walls 22g and 22h carry a reflective coating for this purpose.

In the embodiment of FIG. 8, the holder 22a or 22b has a polygonal cross section defined by flat surfaces $22f_1$, $22f_2$, $22g_1$, $22g_2$, $22h_1$, and $22h_2$, and the light emitted from the cold cathode tube 21a or 21b is guided to the optical guide plate 23 by causing a reflection at these flat surfaces.

Figure 9:
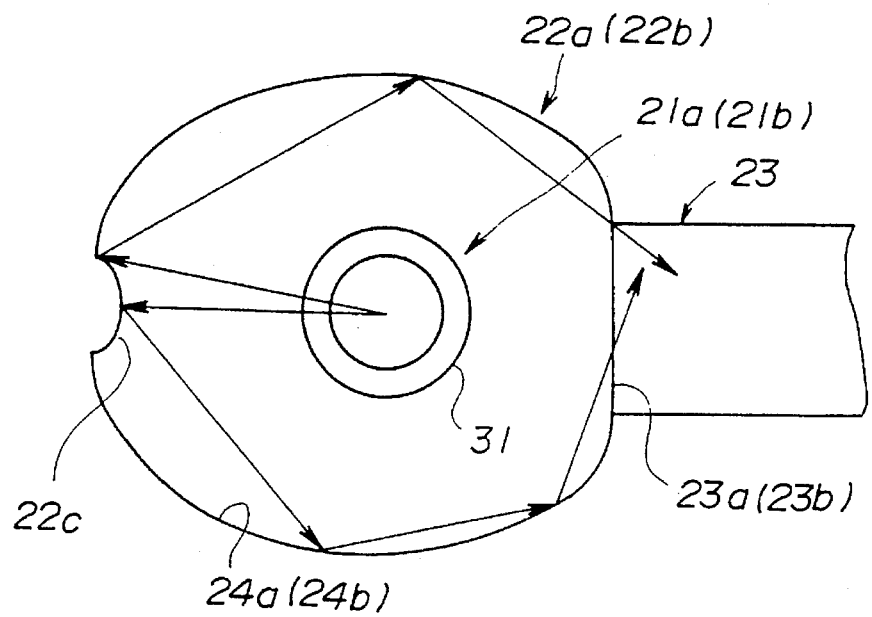

FIG. 9 shows an embodiment wherein a projection 22c is provided on the holder 22a or 22b to change the direction of reflection of the light. By providing such a modified surface, one can reduce the probability of the light emitted from the cold cathode tube 21a or 21b and returning to the tube again. Preferably, the projection 22c is provided so as to oppose the side wall 23a or 23b of the optical guide plate 23 across the cold cathode tube.

Figure 10:
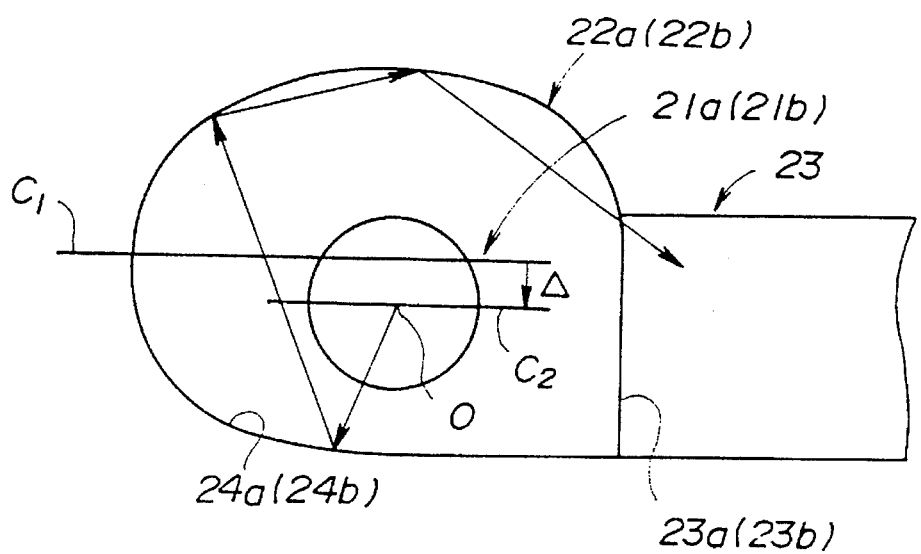
Figure 11:
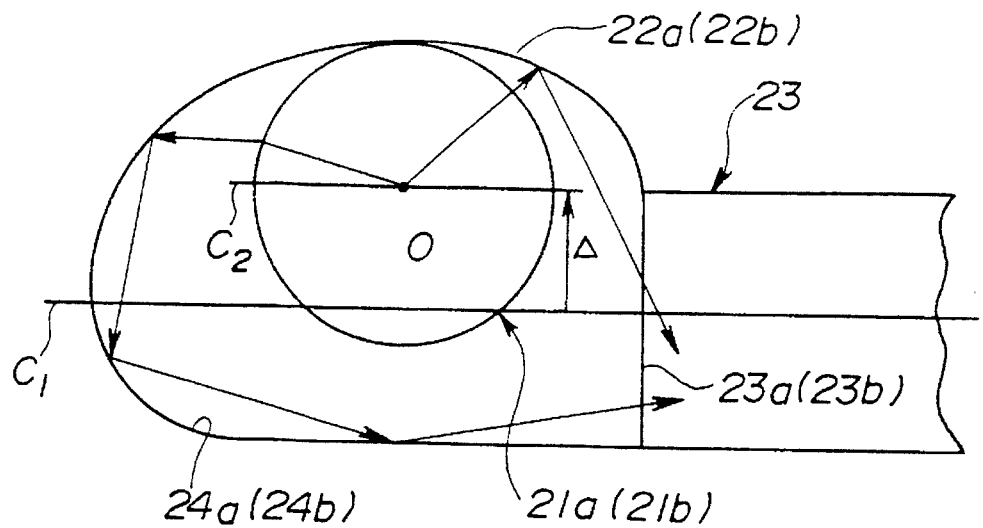

FIG. 10 shows a construction of the holders 22a and 22b, wherein the holder has a conventional construction characterized by a curved wall having a circular cross section except that the center line $C_1$ for the holder 22a and the center line $C_2$ of the tube are offset from each other by a distance Δ. Thereby, the majority of the light that has been emitted from the cold cathode tube is reflected at the curved wall of the holder 22a and is guided to the optical guide plate 23. FIG. 11 shows another similar construction, wherein the position of the cold cathode tube 21a is displaced upward with respect to the holder 22a or 22b in the direction opposite to the case of FIG. 10, with a distance Δ.

Figure 12:
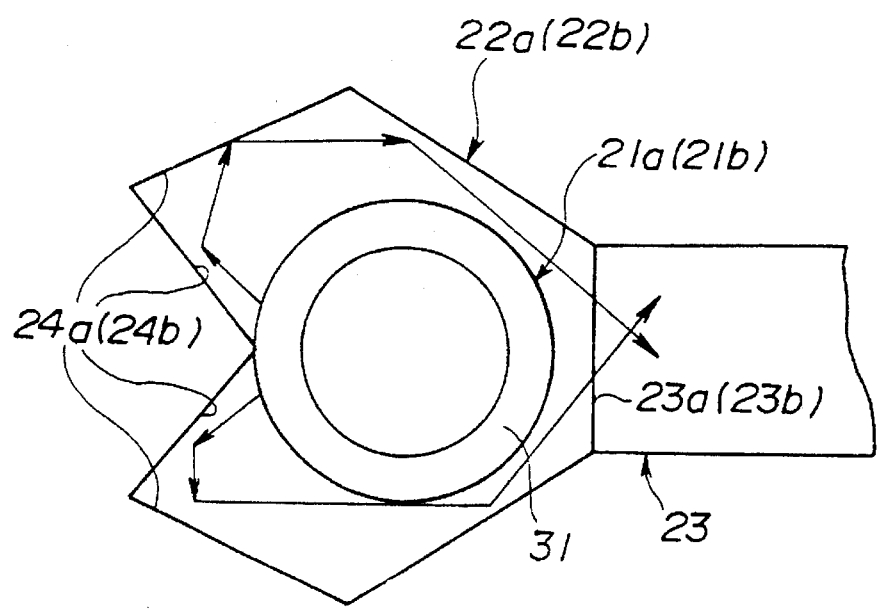

FIG. 12 shows another construction of the holders 22a and 22b, wherein the holder has a polygonal form defined by flat surfaces similarly to the embodiment of FIG. 8, except that the flat surfaces form an apex projecting toward the tube 21a or 21b contrary to the embodiment of FIG. 8. In the illustration, it will be noted that the flat surfaces carry reflective coatings 24a or 24b thereon.

Figure 13:
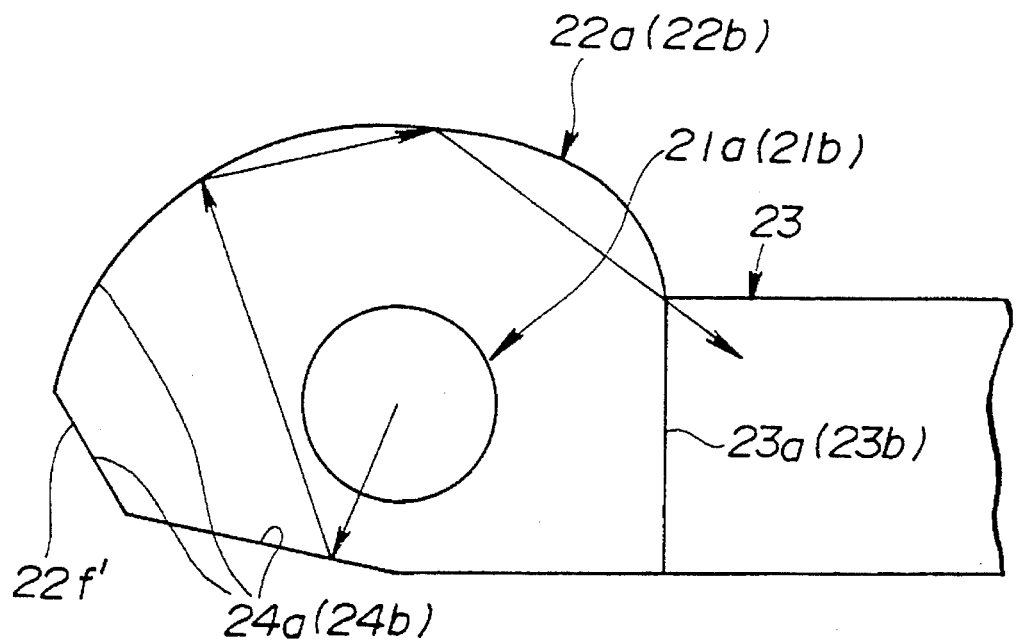

FIG. 13 shows a modification of the embodiment of FIG. 7, wherein a flat surface 22f is formed obliquely to the cold cathode tube with a reduced area as compared with the embodiment of FIG. 7. In this embodiment, too, it is possible to reduce the probability of the light emitted from the cold cathode tube returning again to the cold cathode tube.

Figure 14:
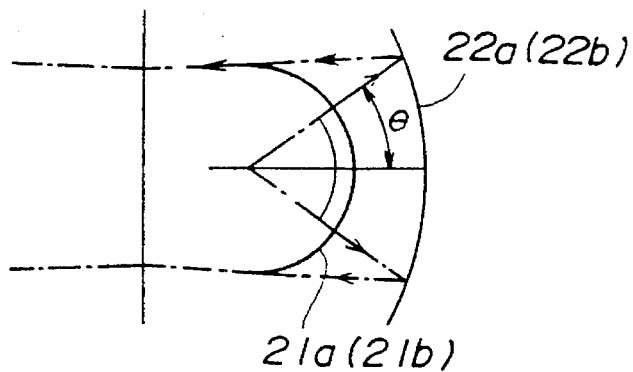
FIGS. 14–16 are diagrams comparing various constructions of the holder used in the planar illumination unit of the present invention.
Figure 15:
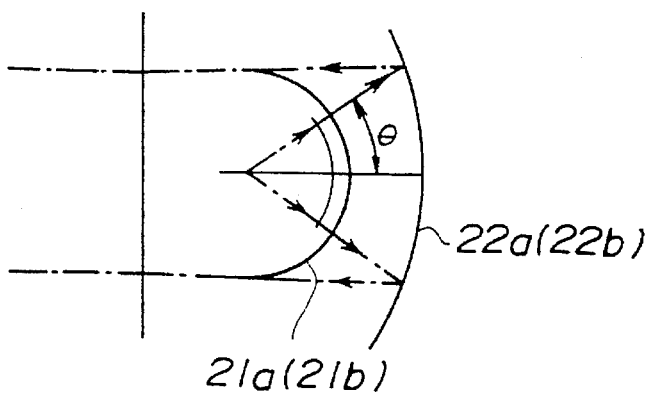
Figure 16:
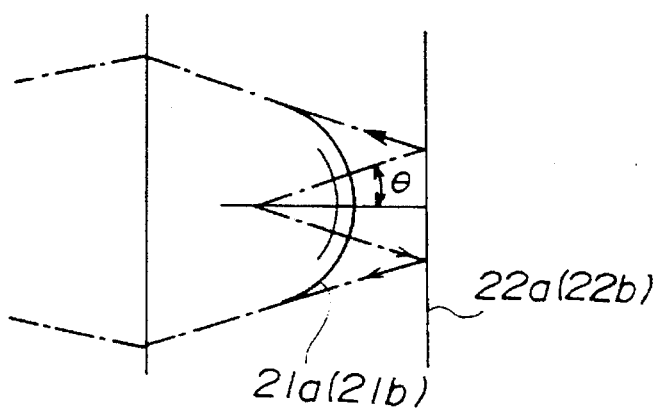

FIGS. 14–16 show the minimum angle θ of the light that is emitted from the cold cathode tube 21a or 21b and enters the optical guide plate 23 without returning to the cold cathode tube, wherein FIG. 14 shows the case wherein the holder 22a or 22b has a circular cross section, FIG. 15 shows the case wherein the holder 22a or 22b has a hyperbolic cross section, and FIG. 16 shows the case wherein the holder 22a or 22b has a planar cross section in correspondence to the embodiment of FIG. 7.

As will be seen, the minimum angle θ becomes largest in the case of FIG. 14 that uses a mirror having the circular cross section, while the angle θ becomes minimum in the case of FIG. 15 that uses a flat mirror surface. The light within this angle θ is reflected to the cold cathode tube. This indicates that the construction of FIG. 16 corresponding to the embodiment of FIG. 7 can emit the light with maximum efficiency, by minimizing the light returning to the cold cathode tube. The following TABLE I summarizes the result of the experiments conducted in correspondence to the constructions of FIGS. 14–16.

TABLE I

| shape | mirror shape radius(mm) | asph. coeff.* | $\theta_{min}$ | efficiency |
|---|---|---|---|---|
| sphere | 2.6 | 0 | 90° | 50% |
|  | 5.2 | 0 | 37° | 79% |
| ellipse | 5.2 | −0.5 | 36° | 80% |
| hyperbolic | 5.2 | −2.0 | 34° | 81% |
|  | 5.2 | −100 | 23° | 87% |
| plane | ∞ | — | 18° | 90% |

*aspherical coefficient

From the foregoing TABLE I, it will be noted that the critical exit angle $\theta_{min}$ becomes minimum when a planar mirror is used as in the embodiment of FIG. 7, wherein the efficiency of radiation of the light to the optical guide plate reaches almost 90%.

It should be noted that the importance of eliminating the returning of the light to the cold cathode tube in the construction of FIG. 3 is demonstrated in the experiment conducted by the inventors. In the experiment, a cold cathode tube having an average luminance of 13220 cd/m² is used for the tube 21a or 21b. The tube has a diameter of 4.1±0.2 mm with an inner diameter of 3.5 mm, and emits the light over an effective length of 110 mm.

In this tube, the total light energy $EP_0$ is gives as $$EP_0 = 13220 \times \pi \times 3.5 \times 110 \times 10^{-6}$$
$$= 17.1 \text{ (cd)}.$$

On the other hand, the light energy $EP_{act}$ that has entered the optical guide plate 23 is represented, assuming the area of the optical guide plate of 2 mm×141 mm and the luminance of the light entering the optical guide plate of 33233 cd/m² as $$EP_{act} = 33233 \times 2 \times 141 \times 10^{-6}$$
$$= 9.37 \text{ cd}.$$

Further, the light energy $EP_{out}$ that is emitted from the optical scattering plate 30 is given, assuming the average luminance of 350 cd/m² on the optical scattering plate 30 and the area of the optical scattering plate 30 of 205 mm ×126 mm=2.58×10⁻² m², as $$EP_{out} = 350 \times 2.58 \times 10^{-2}$$
$$= 9.03 \text{ cd}.$$

The foregoing analysis indicates that there exists a significant reduction in the light energy $EP_{act}$ as compared with the total light energy $EP_0$ that has been emitted by the cold cathode tube, while the loss of the light occurring after the light has entered the optical guide plate 23 is not significant. The foregoing result clearly indicates the importance of the shape of the holders 22a and 22b to reflect the light to the optical guide layer 23 as described with reference to the previous embodiments.

Next, the second feature of the present invention will be described. It should be noted that the previous embodiment shown in FIG. 3 employs a V-shaped top surface having a tilt angle $\theta_1$ for the optical guide plate 23, while the second feature of the present invention optimizes the angle $\theta_1$ such that the light is emitted from the optical guide plate 23 with the highest efficiency. Hereinafter, the optimum angle $\theta_1$ will be examined with reference to FIG. 17.

Figure 17:
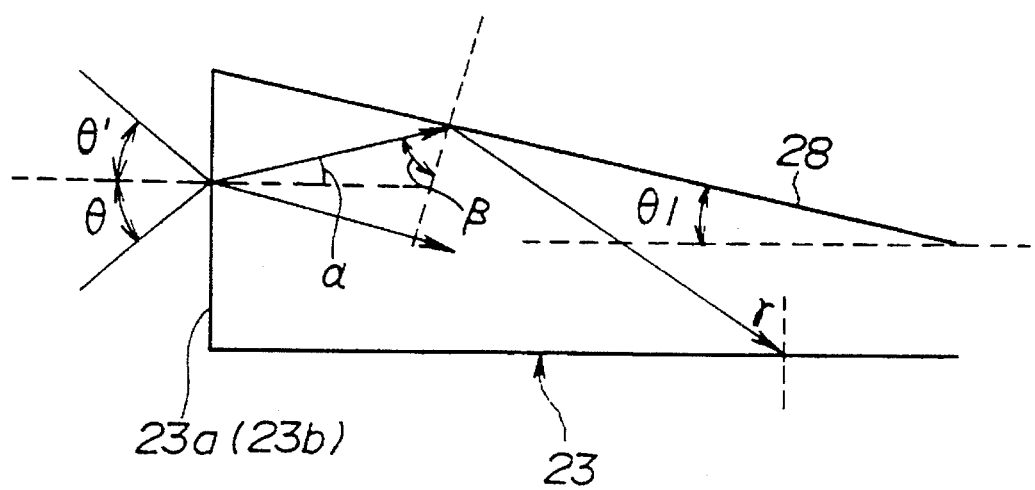
FIG. 17 is a diagram showing the second feature of the present invention.

Referring to FIG. 17, the light impinges the side wall 23a or 23b of the optical guide plate 23 with an incidence angle θ, and the light thus entered into the optical guide plate 23 is refracted with a refraction angle α. The refracted light then impinges upon the tilted top surface of the optical guide layer 23 with an incidence angle β, and the light thus reflected impinges upon the bottom surface of the optical guide plate 23 with an incidence angle r. Hereinafter, the relationship between the incidence angle θ and the tilt angle $\theta_1$ will be described based upon the foregoing parameters, and based upon such a relationship, the condition that the light impinging into the side wall 23a or 23b of the optical guide plate 23 with an arbitrary angle enters into the plate 23, will be derived.

Based upon the result of the analysis given previously with reference to FIG. 4, it is already proved that the light impinging upon the side wall 23a or 23b of the optical guide plate 23 from the upper left direction enters successfully into the plate 23, irrespective of the incidence angle. Therefore, the analysis hereinafter will be directed to the light that impinges upon the side wall 23a or 23b of the optical guide plate 23 from the lower left direction in FIG. 17. In the discussion below, it is assumed that the optical guide plate 23 is formed of an acrylic resin.

From the geometry of FIG. 17, there holds a relationship $$\beta = 90° - \theta_1 - \alpha, \tag{6}$$

and $$r = \beta - \theta_1 = 90° - 2 \times \theta_1 - \alpha. \tag{7}$$

Further, the condition of the total reflection is given as $$\sin \theta = n \cdot \sin \alpha. \tag{8}$$

Thus, the condition that the light impinging upon the side wall with an arbitrary incidence angle is derived by substituting the condition $\theta = 90°$ into the foregoing equation (8) as follows.

$$n \cdot \sin \alpha_{max} \ 1, \tag{9}$$

wherein $\alpha_{max}$ represents the maximum refraction angle and the foregoing equation (9) represents the critical state. In other words, $\alpha_{max}$ represents the critical angle of refraction. By substituting the refractive index n of 1.49 into the equation (9), one obtains the critical angle $\alpha_{max}$ as $$\alpha_{max} = \theta_c = 42°.$$

The foregoing result also indicates that the maximum incidence angle $r_{max}$ is given by $\theta_c$ (=42°). Thus, by substituting the foregoing value to the equation (7), one obtains the tilt angle $\theta_1$ of 3°. In other words, by setting the tilt angle $\theta_1$ to be equal to or smaller than 3°, it is possible to direct the light that has impinged upon the side wall 23a or 23b with an arbitrary angle, into the optical guide plate 23.

FIGS. 18 through 21 show planar illumination units 33–36 each having such an optimized V-shaped top surface for the optical guide plate, wherein the units 33 and 34 of FIGS. 11 and 12 have the construction in that the cold cathode tubes 21a and 21b are disposed adjacent to both side walls of an optical guide plate $23_{-1}$ or $23_{-2}$, while the units 35 and 36 of FIGS. 12 and 13 have a construction wherein only one side wall of an optical guide plate such as $23_{-3}$ or $23_{-4}$ is illuminated by the cold cathode tube. The other side wall is provided with a reflector 37. It should be noted that the optical guide plate $23_{-1}$ of FIG. 18 has the V-shaped top surface, while the optical guide plate $23_{-2}$ of FIG. 19 has a U-shaped top surface. Similarly, the optical guide plate $23_{-3}$ of FIG. 20 has an asymmetrical V-shaped top surface while the optical guide plate $23_{-4}$ of FIG. 21 has an asymmetrical U-shaped top surface.

Figure 18:
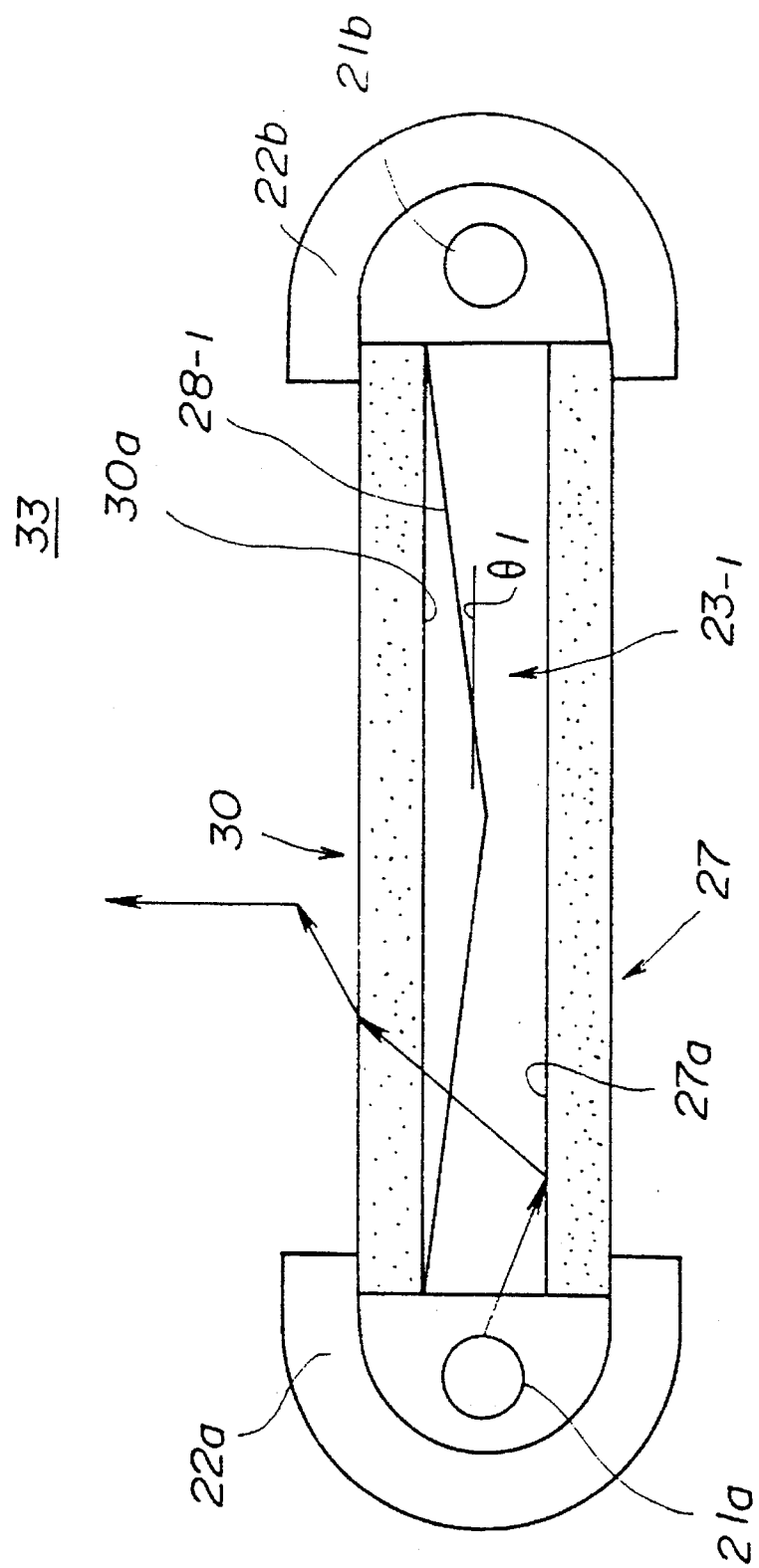
FIG. 18 is a diagram showing an embodiment of the planar illumination unit having the second feature of the present invention.
Figure 19:
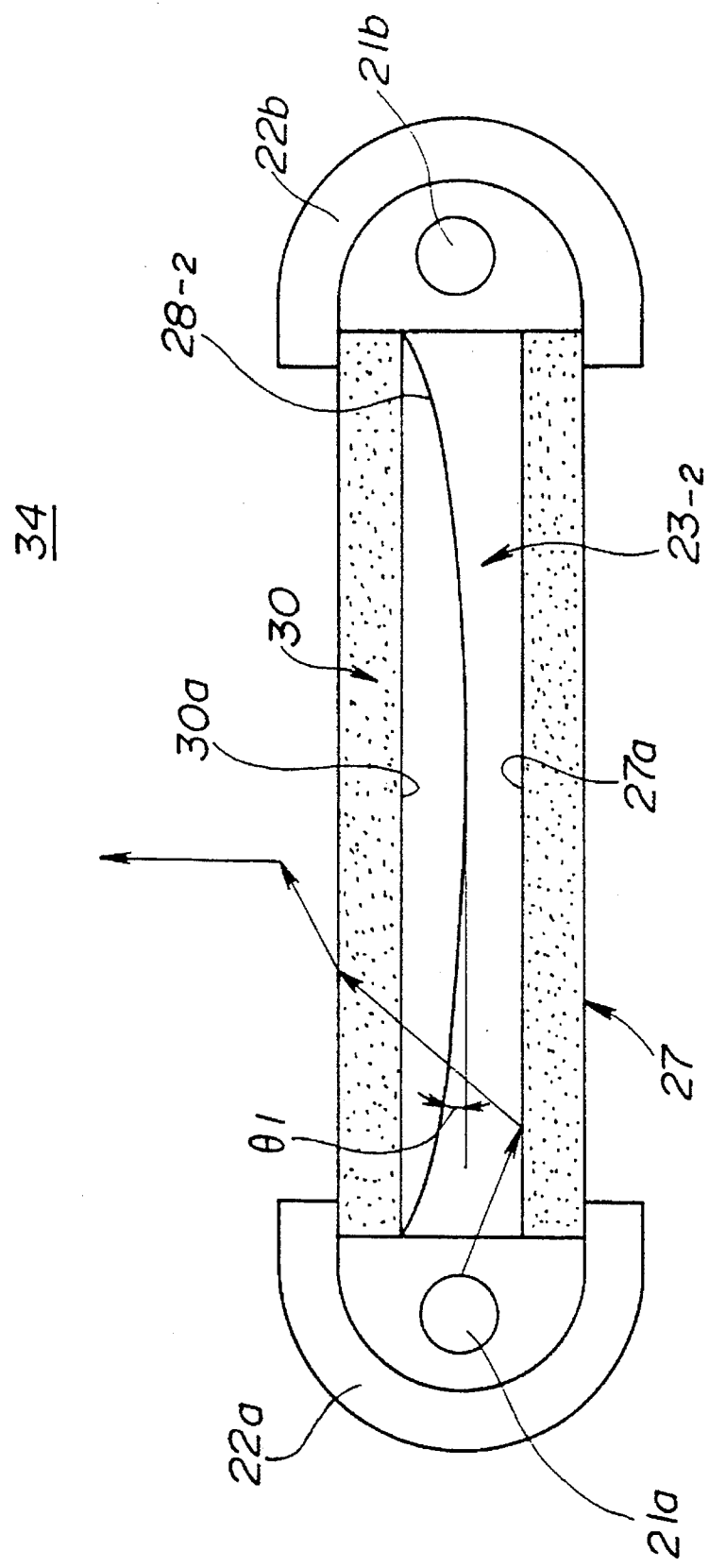
FIG. 19 is a diagram showing another embodiment of the planar illumination unit having the second feature of the present invention.
Figure 20:
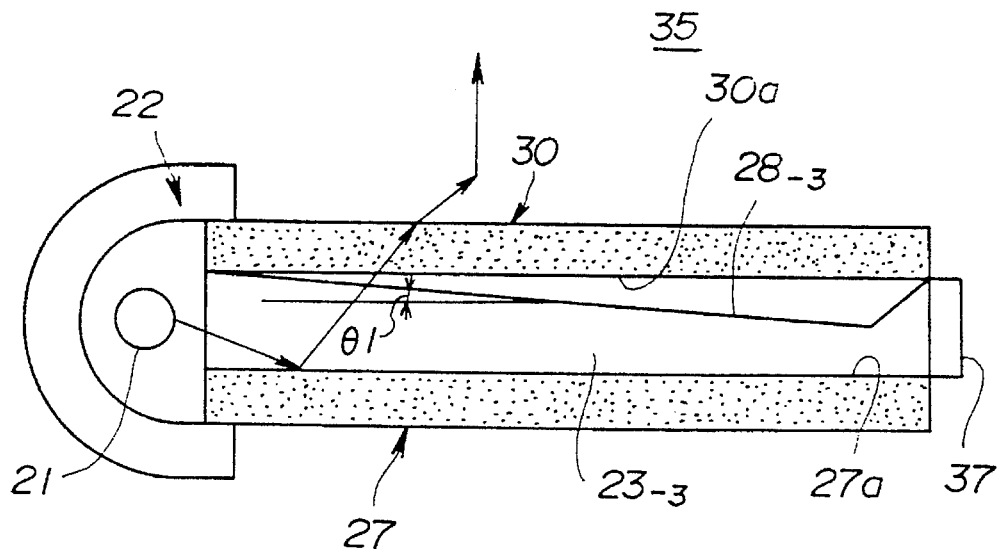
FIG. 20 is a diagram showing still other embodiment of the planar illumination unit having the second feature of the present invention.
Figure 21:
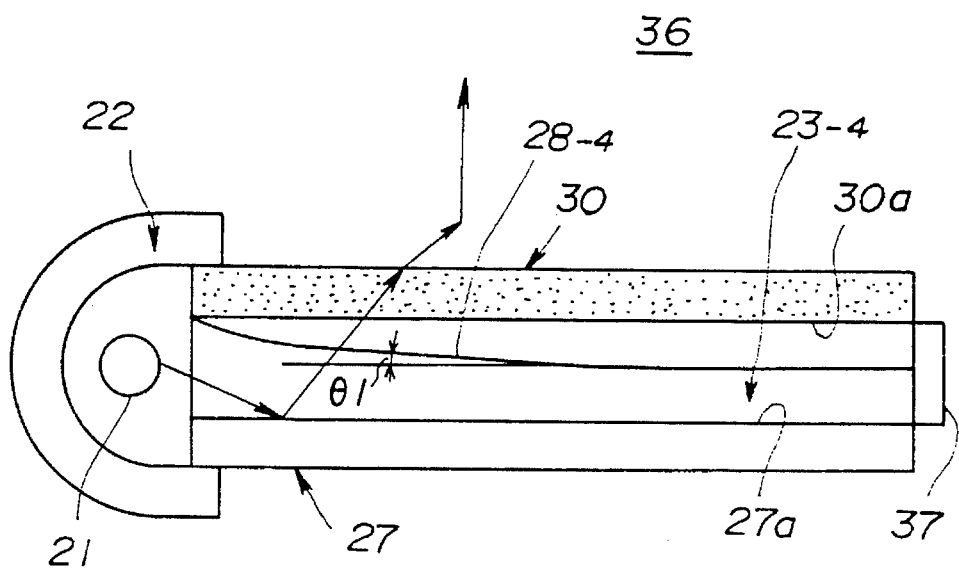
FIG. 21 is a diagram showing still other embodiment of the planar illumination unit having the second feature of the present invention.

In the embodiments of FIGS. 18 and 20, it should be noted that the tilt angle $\theta_1$ of the V-shaped top surface is set equal to or smaller than 3°. In the embodiments of FIGS. 19 and 21, on the other hand, it should be noted that the maximum tilt angle $\theta_1$ of the U-shaped top surface is set equal to or smaller than 3° in the steepest part of the top surface. Thereby, the light that impinges into the optical guide plate 23 even with an incidence angle of 90° with respect to the side wall, enters into the optical guide plate.

Next, a third feature of the present invention will be described. The third feature of the present invention relates to the optimization of the prismatic lens film 26 that is provided on the optical guide plate 23 for providing a directivity in the light that is emitted from the top surface of the optical guide plate 23. For this purpose, it should be noted that the prismatic lens film 26 carries thereon a plurality of ridges 29 having a generally triangular cross section. The ridges thereby act as a prism. In the present invention, the apex angle $\theta_2$ of the prism 29 is optimized such that the efficiency of radiation of the light from the lens film 26 is maximized. Hereinafter, the optimization of the angle $\theta_2$ will be described with reference to FIG. 22.

Figure 22:
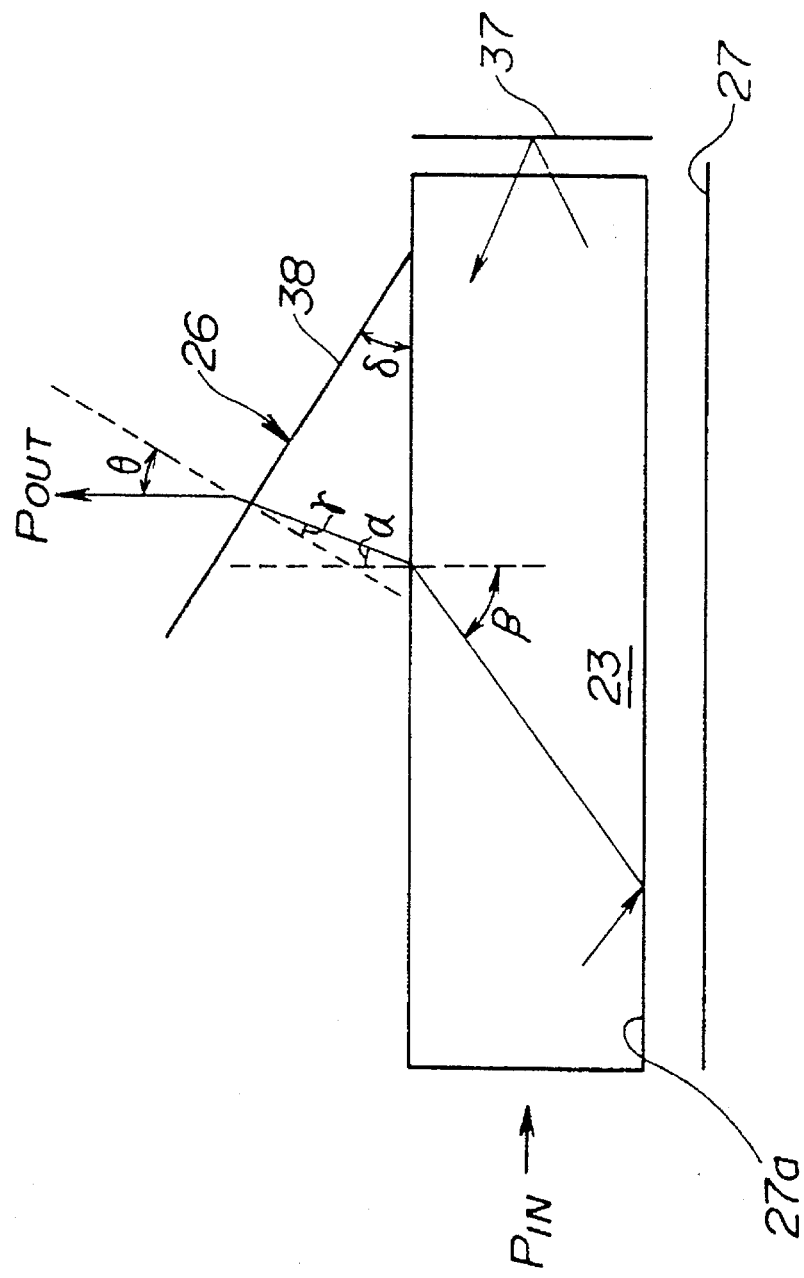
FIG. 22 is a diagram showing a third feature of the present invention.

Referring to the geometry of FIG. 22, the light that has exited from the optical guide plate 23 with an exit angle a impinges upon a prismatic surface 38 of the prismatic lens film 26 with an incidence angle r, wherein the prismatic surface 38 has a tilt angle $\delta$ with respect to the top surface of the optical guide plate 23 and causes a refraction in the light thus impinged such that the light exits with an exit angle $\delta$ as a light $P_{out}$. In the analysis hereinafter, the loss in the optical guide plate 23 is ignored.

Assuming that the light is emitted from the optical guide plate 23 after reflection and scattering at the lower principal surface 27a of the optical guide plate 23, the intensity or the optical energy of the light that is emitted from the optical guide plate 23 is represented as $$P(\alpha) = P_0 \cos \alpha \tag{10},$$

where $P_0$ represents the energy of the light emitted from the plate 23. Further, the average exit angle Ave($\alpha$) of the optical beam is obtained as $$Ave(\cos\alpha) = 1/P_0 \int_0^{\pi/2} P_0 \cos^2\alpha \cdot d\alpha = \pi/4. \tag{11}$$

Thus, from the equation (11), it will be understood that the average exit angle Ave($\alpha$) takes the value of 45° and one can maximize the output energy $P_{out}$ of the light by setting the angle $\theta$ equal to the angle $\delta$ ($\theta = \delta$). From the Snell's law, there holds a relationship $$n \cdot \sin r = \sin \theta. \tag{12}$$

Thereby, one obtains a relationship $$\alpha + r = \sin^{-1}(n \cdot \sin r). \tag{13}$$

When an acrylic resin is used for the optical guide plate 23 as described previously, the refractive index n in the foregoing representation has a value of 1.49. Thereby, one obtains an angle of 42° for the r (r=42°). In correspondence to this, a value of 42° is obtained for the angle $\delta$. In other words, the angle $\delta$ agrees to the critical angle of refraction.

Figure 23:
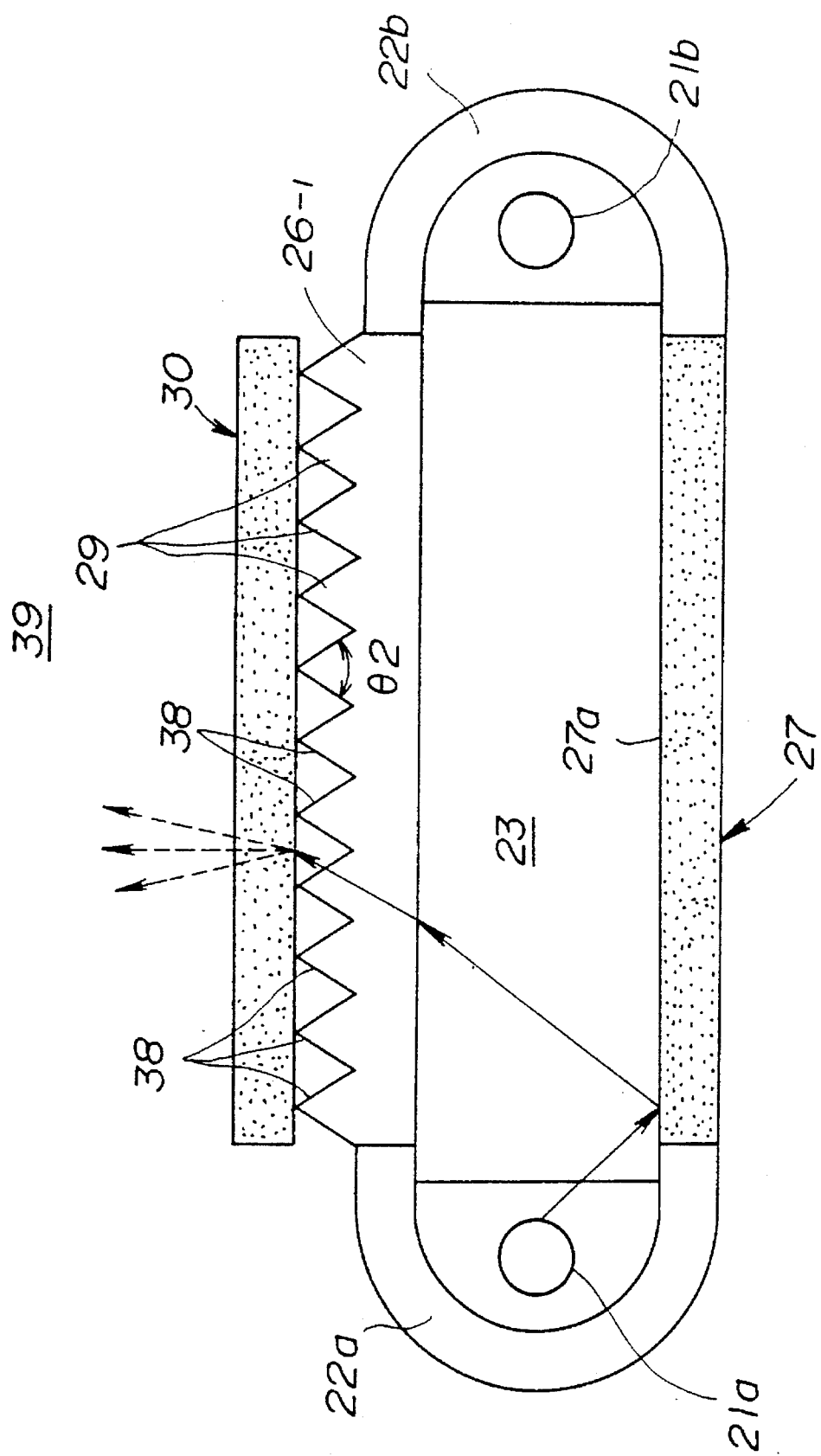
FIG. 23 is a diagram showing an embodiment of the planar illumination unit having the third feature of the present invention.

In a planar illumination unit 39 of FIG. 23 having the construction of using the cold cathode tubes 21a and 21b at both sides of the optical guide plate 23, the desirable cross section of the prismatic lens film becomes an isosceles triangle with an apex angle $\theta_2$, wherein the angle $\theta_2$ is optimized to a value of 2×(90°−42°)=96°.

Figure 25:
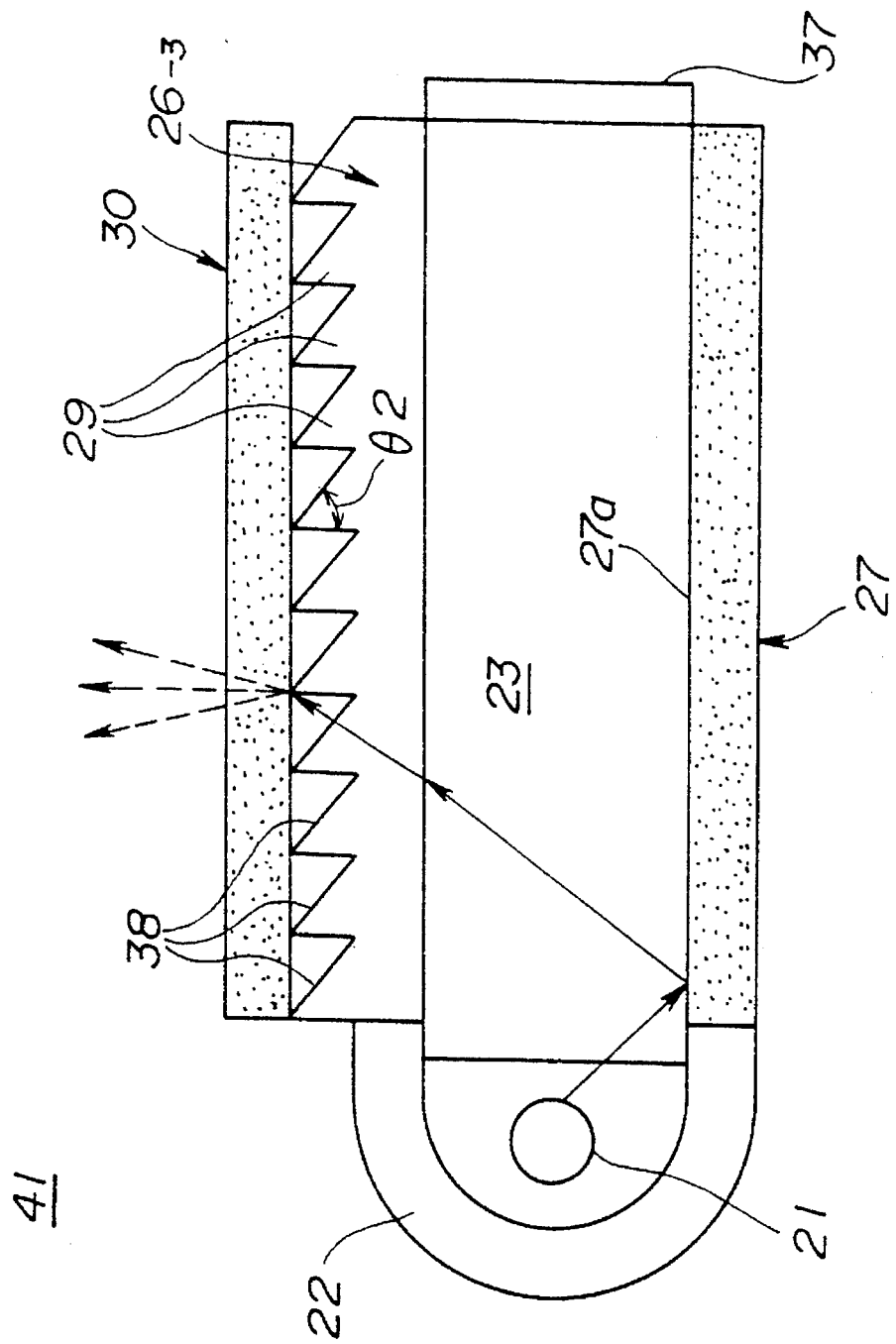
FIG. 25 is a diagram showing still other embodiment of the planar illumination unit having the third feature of the present invention.

In a planar illumination unit 41 wherein the cold cathode tube is provided only at one side of the optical guide plate as shown in FIG. 25, the prismatic lenses have a cross section of a sawtooth form, with the apex angle $\theta_2$ that has an optimized value of 48° (=90°−42°).

By setting the apex angle $\theta_2$ as set forth above for the planar illumination unit 39 of FIG. 23 or the unit 41 of FIG. 25, one can maximize the luminance of the unit in the direction perpendicular to the plane of the unit.

Figure 24:
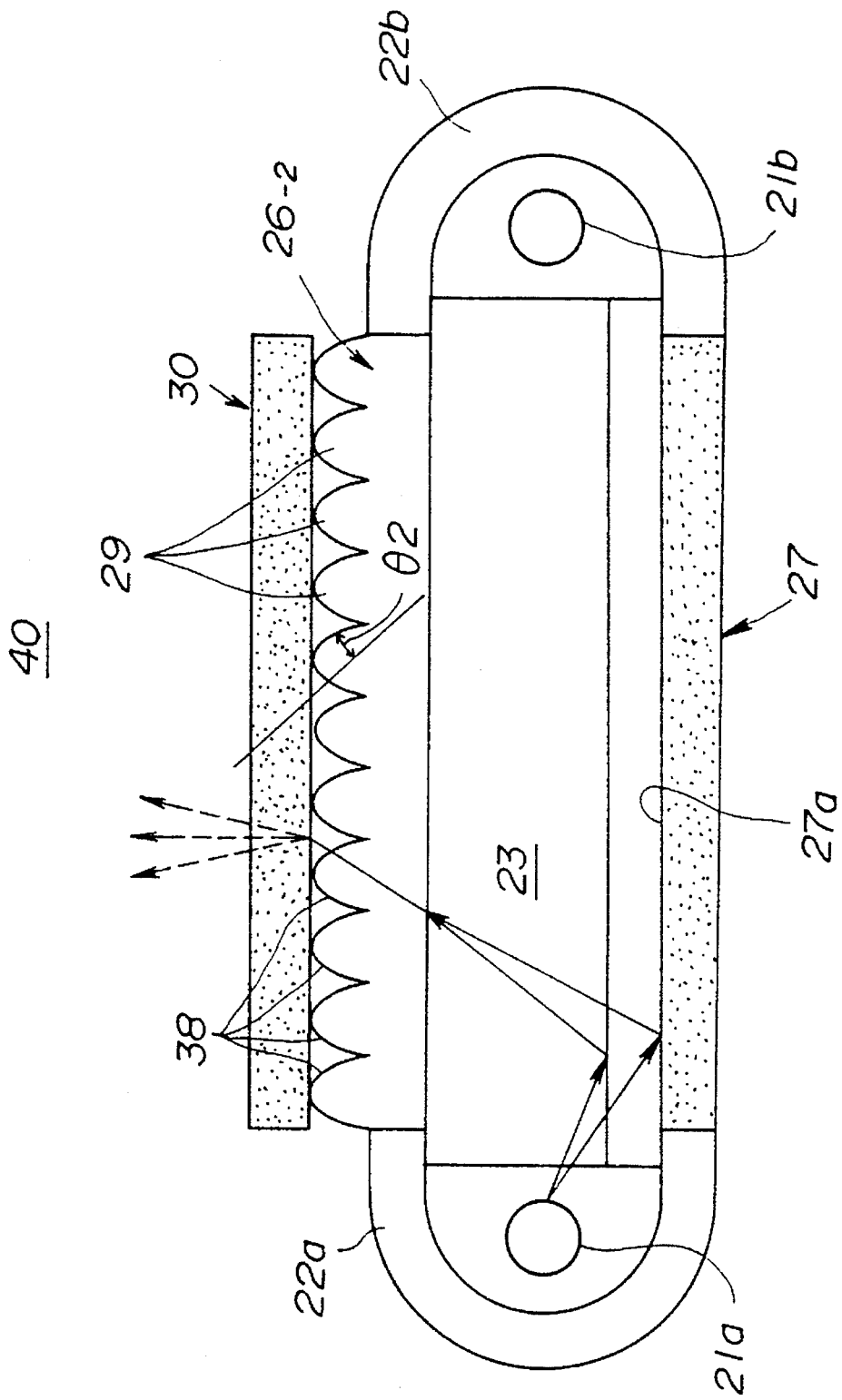
FIG. 24 is a diagram showing another embodiment of the planar illumination unit having the third feature of the present invention.
Figure 26:
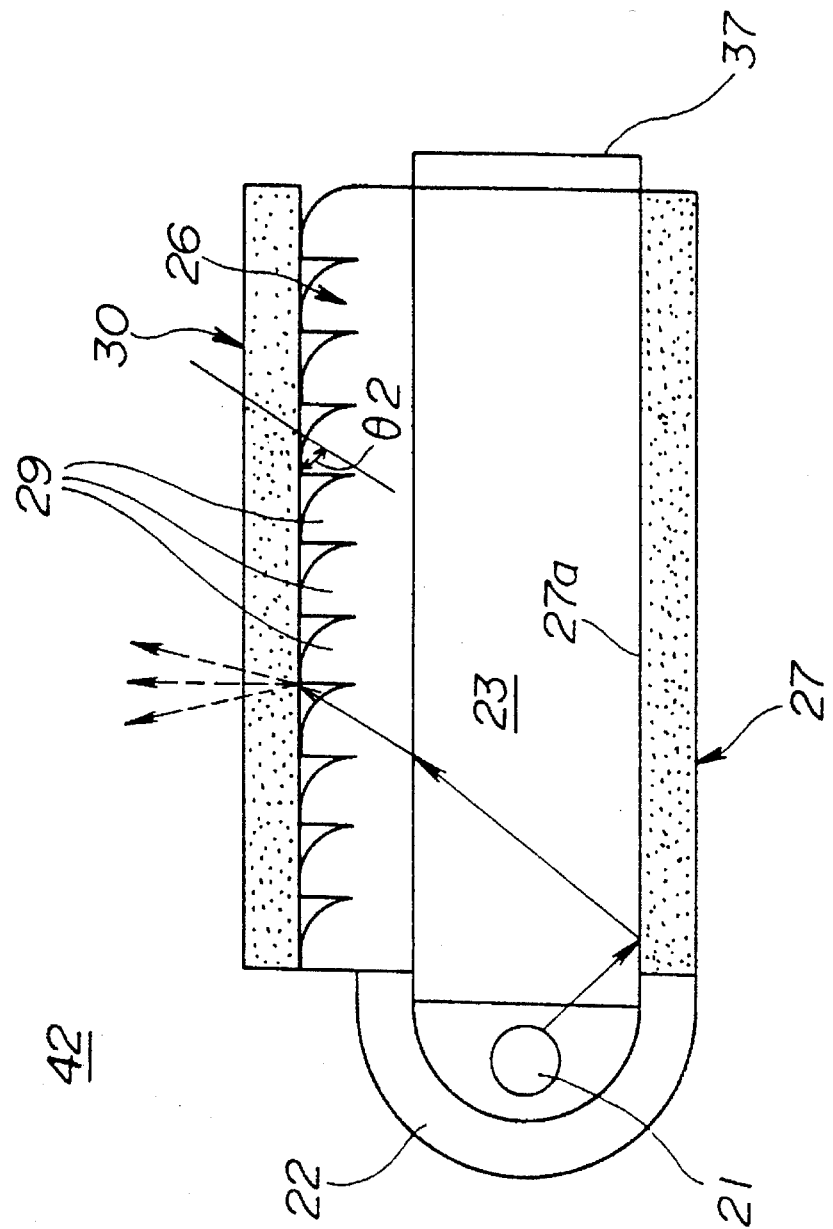
FIG. 26 is a diagram showing still other embodiment of the planar illumination unit having the third feature of the present invention.

Alternatively, one may use a prismatic lens film $26_{-2}$ as shown in a planar illumination unit 40 of FIG. 24, wherein the prismatic lens film $26_{-2}$ carries thereon rounded or elliptical ridges 38 in place of the triangular ridges of FIG. 23. Similarly, a planar illumination unit 42 of FIG. 26 uses a prismatic lens film $26_{-4}$ having rounded, semi-elliptical ridges in place of the sawtooth ridges of FIG. 25. In such a case of FIG. 24 or FIG. 26, it is possible to maximize the intensity of the emitted light by setting the direction of the normal drawn to the rounded surface of the ridges, such that the angle $\theta_2$ defined between the foregoing normal and the horizontal surface such as the surface 30a of the optical scattering plate 30 takes the value corresponding to the embodiment of FIG. 23 that uses the prismatic lens film $26_{-1}$ or the embodiment of FIG. 25 that uses the prismatic lens film $26_{-3}$. Thus, in the unit 40 of FIG. 24, the optimum apex angle $\theta_2$ is about 96°, while in the unit 42 of FIG. 26, the optimum apex angle $\theta_2$ is about 48°. The foregoing value changes of course depending on the material used for the optical guide plate 23. When a polycarbonate resin having a refractive index n of 1.586 is employed in place of the acrylic resin, the optimum apex angle $\theta_2$ assumes a value of 101°.

Figure 27:
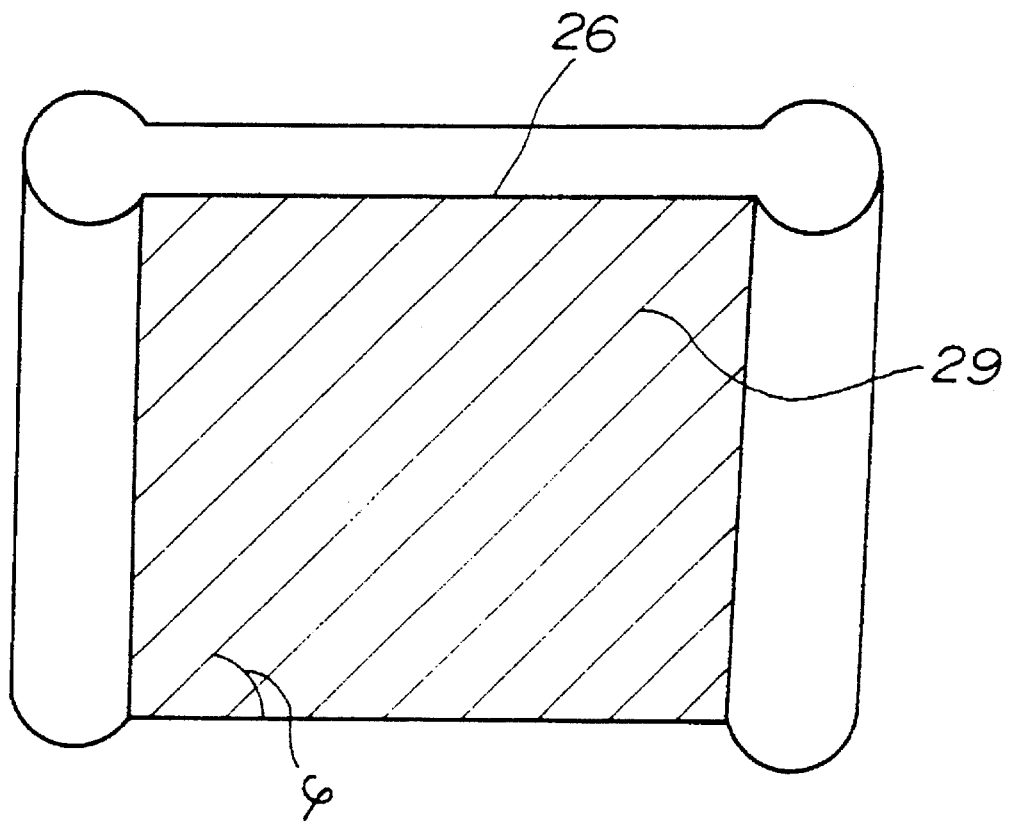
FIG. 27 is a diagram showing an embodiment of the liquid crystal display panel.

When using the prismatic lens film for the improvement in the directivity of the light emitted from the planar illumination unit, it should be noted that the directivity changes in the extending direction of the ridges and in the direction perpendicular to the ridges. Thereby, in order to minimize the difference in the directivity in the vertical plane and in the horizontal plane, it is preferable to form the ridges on the prismatic lens film 26 to extend obliquely as indicated in FIG. 27. In FIG. 27, the ridges 29 extends obliquely with an angle $\phi$ with respect to the horizontal line, wherein it is preferable to set the angle $\phi$ in the range of 30°–60°, preferably about 45°. It should be noted that such a construction is also preferable in viewpoint of eliminating moire that tends to occur when the prismatic lens film 26 is disposed such that the ridges 29 extend horizontally or vertically to the elongating direction of the cold cathode tube.

In the construction of FIGS. 23–26, it is important to note that the prismatic lens film 26 is disposed between the optical guide plate 23 and the optical scattering plate 30, contrary to the conventional construction that provides the prismatic lens film above the optical scattering plate 30. By doing so, it is possible to smooth the angular distribution of the luminance of the panel.

Figure 28:
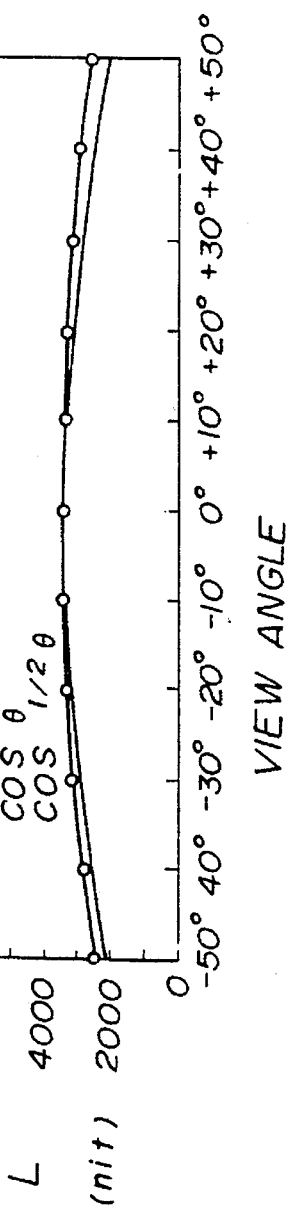
FIGS. 28–31 are diagrams showing the experiment conducted on the planar illumination unit including the one having the third feature.

FIGS. 28–31 show the profile of luminance of the planar illumination panel as a function of the view angle, wherein FIG. 28 shows the result for a panel that includes an optical guide plate and an optical scattering plate thereon. In other words, the panel used in the experiment of FIG. 28 lacks the prismatic lens film. As shown in FIG. 28, the luminance of the panel changes gently, with the maximum luminance of about 3400 nit in correspondence to the view angle of 0°. In the drawings, the broken line and the thin solid line represent a result of theoretical calculation, while the thick solid line connecting the open circles represent the result of the experiment.

Figure 29:
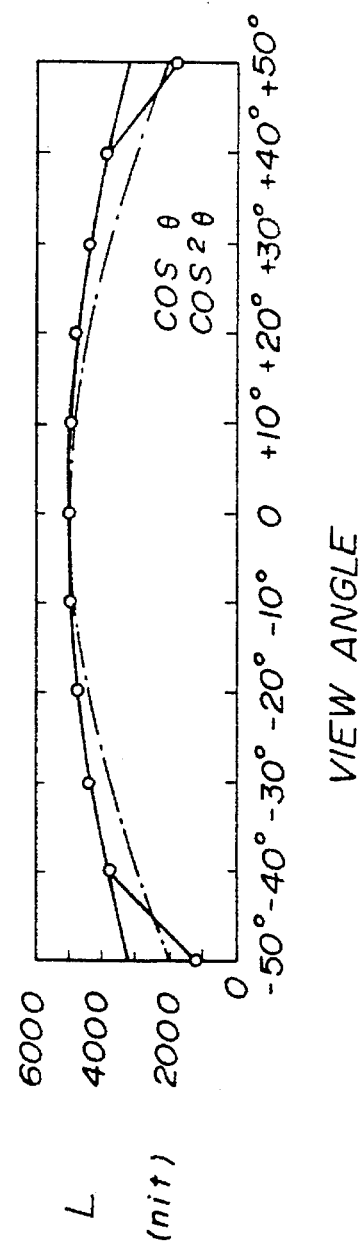

In FIG. 29, the experiment is conducted under the condition identical to the condition of FIG. 28 except that the prismatic lens film is provided on the optical diffusion plate that has been used in the experiment FIG. 28. As will be noted in FIG. 29, the luminance increases significantly as compared with the case of FIG. 28, as a result of the increased directivity of the light emission. On the other hand, it will be noted from FIG. 29 that the luminance of the panel drops sharply when the view angle has exceeded about 40° in the positive and negative directions. This indicates that the user may have a difficulty in viewing an image on the liquid crystal display panel when the user is not in the position to face the panel straight.

Figure 30:
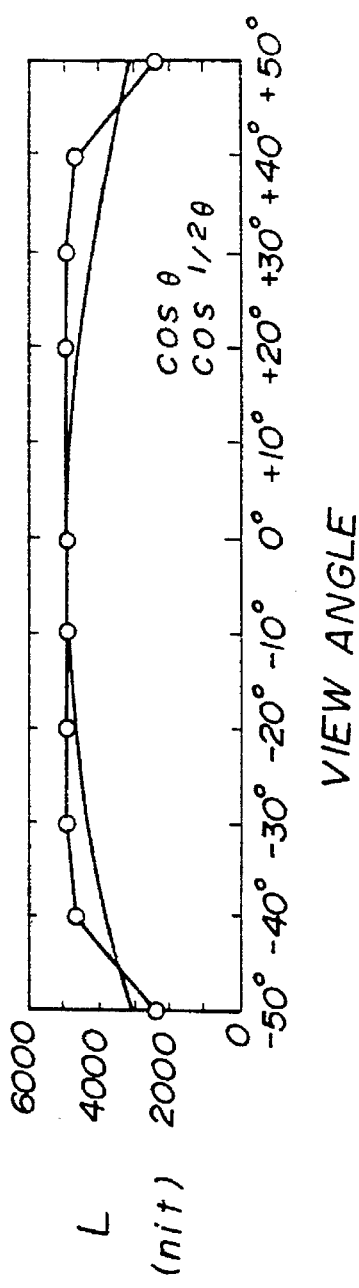

FIG. 30 shows the result for the planar illumination panel wherein the prismatic lens film is provided directly on the optical guide plate, without providing an optical scattering plate. In this case, too, the luminance of the panel increases similarly to the case of FIG. 29, while the sharp drop of the luminance with the view angle exceeding ±40° is even enhanced.

Figure 31:
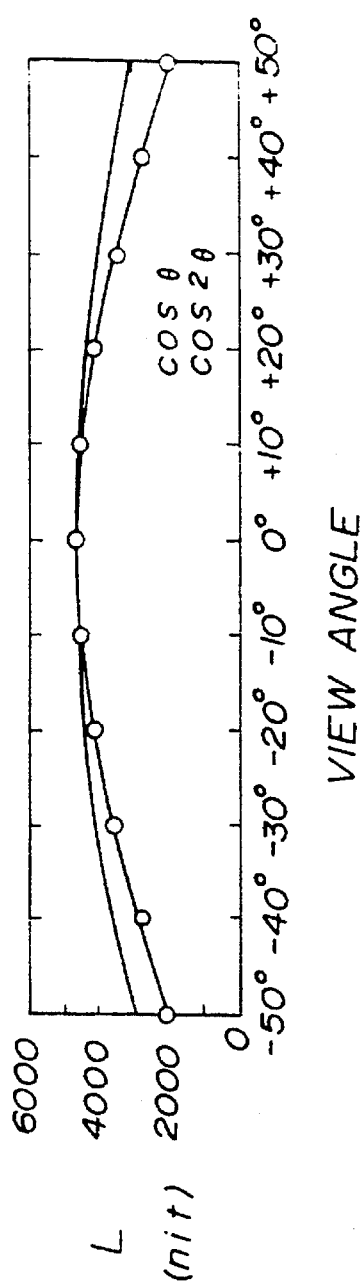

FIG. 31 corresponds to the construction of FIG. 23 wherein the prismatic lens film is disposed between the optical guide plate and the optical scattering plate. In this case, while the high luminance is maintained for the view angle of about 0°, the problem of sharp drop of the luminance is eliminated and the transition of the luminance with the view angle occurs gradual.

Further, the present invention is not limited to the embodiments described heretofore, but various variations and modifications may be made without departing from the scope of the invention.

What is claimed is:

1. A planar illumination unit, comprising:

an optical guide layer having first and second, mutually opposing principal surfaces, said optical guide layer being laterally defined by a side wall and guiding a light incident thereto at said side wall, said optical guide layer emitting said light from said first principal surface;

light source means, facing said side wall of said optical guide layer for injecting said light into said optical guide layer through said side wall, said light source means including first reflection means for reflecting said light produced by said light source means toward said side wall of said optical guide layer;

an optical scattering layer having first and second, mutually opposing principal surfaces, said optical scattering layer being disposed such that said second principal surface of said optical scattering layer faces said first principal surface of said optical guide layer thereby for receiving said light emitted from said first principal surface of said optical guide layer, said optical scattering layer causing scattering in said light that has been received from said optical guide layer and emitting said light from said first principal surface;

second reflection means, provided on said second principal surface of said optical guide layer, for reflecting a light incident to said second principal surface of said optical guide layer; and directivity means having first and second opposing principal surfaces and provided on said first principal surface of said optical guide layer such that said second principal surface of said directivity means faces said first principal surface of said optical guide layer, said directivity means being disposed such that said first principal surface of said directivity means faces said second principal surface of said optical scattering layer, said directivity means carrying a plurality of ridges on said first principal surface so as to extend in parallel with each other, each of said plurality of ridges having an apex angle such that said plurality of ridges transmit an optical beam incident at any arbitrary angle to said second principal surface of said directivity means.

2. A planar illumination unit as claimed in claim 1, wherein said directivity means comprises a transparent film having first and second principal surfaces coincident to said first and second principal surfaces of said directivity means, respectively, said transparent film carrying, on said first principal surface thereof, said plurality of ridges extending parallel with each other.

3. A planar illumination unit as claimed in claim 2, wherein each of said plurality of ridges has an isosceles-triangular cross section, with said apex angle set to approximately 96°.

4. A planar illumination unit comprising:

an optical guide layer having first and second, mutually opposing principal surfaces, said optical guide layer being laterally defined by a side wall and guiding a light incident thereto at said side wall, said optical guide layer emitting said light from said first principal surface;

light source means, facing said side wall of said optical guide layer for injecting said light into said optical guide layer through said side wall, said light source means including first reflection means for reflecting said light produced by said light source means toward said side wall of said optical guide layer;

an optical scattering layer having first and second, mutually opposing principal surfaces, said optical scattering layer being disposed such that said second principal surface of said optical scattering layer faces said first principal surface of said optical guide layer thereby for receiving said light emitted from said first principal surface of said optical guide layer, said optical scattering layer causing scattering in said light that has been received from said optical guide layer and emitting said light from said first principal surface;

second reflection means, provided on said second principal surface of said optical guide layer, for reflecting a light incident to said second principal surface of said optical guide layer; and directivity means having first and second opposing principal surfaces and provided on said first principal surface of said optical guide layer such that said second principal surface of said directivity means faces said first principal surface of said optical guide layer, said directivity means being disposed such that said first principal surface of said directivity means faces said second principal surface of said optical scattering layer, said directivity means carrying a plurality of ridges on said first principal surface so as to extend in parallel with each other, said directivity means including a transparent film having first and second principal surfaces coincident to said first and second principal surfaces of said directivity means, respectively, said transparent film carrying, on said first principal surface thereof, said plurality of ridges extending parallel with each other, each of said plurality of ridges having a sawtooth cross section, with an apex angle set to approximately 48°.

5. A liquid display panel, comprising:

a liquid crystal cell panel having first and second, mutually opposing surfaces, said liquid crystal cell panel including liquid crystal molecules therein; and a planar illumination unit having first and second, mutually opposing principal surfaces and being disposed such that said first principal surface of said planar illumination unit faces said second principal surface of said liquid crystal cell panel, said planar illumination unit comprising:

an optical guide layer having first and second, mutually opposing principal surfaces, said optical guide layer being laterally defined by a side wall and guiding a light incident thereto at said side wall, said optical guide layer emitting said light from said first principal surface;

light source means, facing said side wall of said optical guide layer, for injecting said light into said optical guide layer through said side wall, said light source means including first reflection means for reflecting said light produced by said light source means toward said side wall of said optical guide layer;

an optical scattering layer having first and second, mutually opposing principal surfaces, said optical scattering layer being disposed such that said second principal surface of said optical scattering layer faces said first principal surface of said optical guide layer thereby for receiving said light emitted from said first principal surface of said optical guide layer, said optical scattering layer causing scattering in said light received from said optical guide layer and emitting said light from said first principal surface;

second reflection means, provided on said second principal surface of said optical guide layer, for reflecting a light incident to said second principal surface of said optical guide layer; and directivity means having first and second opposing principal surfaces and provided on said first principal surface of said optical guide layer such that said second principal surface of said directivity means faces said first principal surface of said optical guide layer, said directivity means being disposed such that said first principal surface of said directivity means faces said second principal surface of said optical scattering means, said directivity means carrying a plurality of ridges on said first principal surface so as to extend in parallel with each other, each of said plurality of ridges having an apex angle such that said plurality of ridges transmit an optical beam incident at any arbitrary angle to said second principal surface of said directivity means.

* * * * *

UNITED STATES PATENT AND TRADEMARK OFFICE
CERTIFICATE OF CORRECTION

PATENT NO. :     5,550,657
DATED      :     August 27, 1996
INVENTOR(S) :    Akira TANAKA et al.

It is certified that error appears in the above-indentified patent and that said Letters Patent is hereby corrected as shown below:

Column 1

Line 9, "and more particularly" should be --and, more particularly,--.

Column 9

Line 33, "angle 8" should be --angle $\theta$--.

Signed and Sealed this

Seventh Day of January, 1997

Attest:

BRUCE LEHMAN

*Attesting Officer*      Commissioner of Patents and Trademarks

UNITED STATES PATENT AND TRADEMARK OFFICE
CERTIFICATE OF CORRECTION

PATENT NO. : 5,550,657

DATED : August 27, 1996

INVENTOR(S) : Akira TANAKA et al.

It is certified that error appears in the above-indentified patent and that said Letters Patent is hereby corrected as shown below:

Column 1

Line 9, "and more particularly" should be --and, more particularly,--.

Column 9

Line 33, "angle 8" should be --angle θ--.

Signed and Sealed this

Eighth Day of April, 1997

*Attest:*

BRUCE LEHMAN

*Attesting Officer*　　　*Commissioner of Patents and Trademarks*

UNITED STATES PATENT AND TRADEMARK OFFICE
CERTIFICATE OF CORRECTION

PATENT NO. : 5,550,657
DATED : August 27, 1996
INVENTOR(S) : Akira TANAKA et al.

It is certified that error appears in the above-identified patent and that said Letters Patent is hereby corrected as shown below:

TITLE PAGE: [73] Assignee:

Change "Fujitsu Limited, Japan" to --Fujitsu Limited, Kawasaki; Fujitsu Kasei Limited, Yokohama, both of Japan--.

Signed and Sealed this

Thirty-first Day of March, 1998

*Attest:*

BRUCE LEHMAN

*Attesting Officer*     *Commissioner of Patents and Trademarks*